(12) United States Patent  
Katsumata

(10) Patent No.: US 8,945,750 B2  
(45) Date of Patent: Feb. 3, 2015

(54) ELECTRONIC APPARATUS, CONTROL METHOD AND PROGRAM THEREOF, AND BATTERY FOR OPERATING ELECTRONIC APPARATUS

(75) Inventor: Momoe Katsumata, Niiza (JP)

(73) Assignee: Canon Kabushiki Kaisha, Tokyo (JP)

( * ) Notice: Subject to any disclaimer, the term of this patent is extended or adjusted under 35 U.S.C. 154(b) by 1513 days.

(21) Appl. No.: 11/908,892

(22) PCT Filed: May 12, 2006

(86) PCT No.: PCT/JP2006/309977
§ 371 (c)(1),
(2), (4) Date: Sep. 17, 2007

(87) PCT Pub. No.: WO2006/121212
PCT Pub. Date: Nov. 16, 2006

(65) Prior Publication Data
US 2009/0023022 A1    Jan. 22, 2009

(30) Foreign Application Priority Data

May 13, 2005   (JP) .................................. 2005-140840

(51) Int. Cl.
*H01M 6/00*    (2006.01)
*H01M 16/00*   (2006.01)
(Continued)

(52) U.S. Cl.
CPC ........ *H01M 16/006* (2013.01); *H01M 8/04179* (2013.01); *H01M 8/04201* (2013.01);
(Continued)

(58) Field of Classification Search
CPC ..... H01M 8/04; H01M 2250/30; Y02E 40/72

USPC ......................................................... 429/122
See application file for complete search history.

(56) References Cited

U.S. PATENT DOCUMENTS 3,600,229 A *  8/1971  Torkildsen .................... 429/430
6,673,481 B1 *  1/2004  Reiser et al. .................. 429/413
(Continued)

FOREIGN PATENT DOCUMENTS

JP       11-317236       11/1999
JP      2000-215905       8/2000
(Continued)

OTHER PUBLICATIONS

The above references were cited in a May 10, 2010 Extended European Search Report a copy of which is enclosed of the counterpart European Patent Application No. 06746643.03.
(Continued)

*Primary Examiner* — Lore Jarrett
(74) *Attorney, Agent, or Firm* — Cowan, Liebowitz & Latman, P.C.

(57) ABSTRACT

An electronic apparatus using a fuel cell as at least one electric power source. The fuel cell has an electric power output unit for outputting an electric power through a chemical reaction between fuel gas and oxidant gas, a purge device for purging the electric power output unit and a purge control unit for issuing a purge instruction to the purge device. The electronic apparatus has a monitor unit for monitoring a consumption power, an operation state or a manipulated state of the electronic apparatus, and a purge permission unit for judging from an output of the monitor unit whether the purge control unit is permitted to issue the purge instruction, and outputting a judgment result to the purge control unit.

6 Claims, 15 Drawing Sheets

(51) Int. Cl.
*H01M 8/04* (2006.01)
*H01M 8/10* (2006.01)

(52) U.S. Cl.
CPC ...... *H01M8/04208* (2013.01); *H01M 8/04231* (2013.01); *H01M 8/04298* (2013.01); *H01M 8/04552* (2013.01); *H01M 8/04559* (2013.01); *H01M 8/04097* (2013.01); *H01M 2008/1095* (2013.01); *H01M 2250/30* (2013.01); *Y02E 60/50* (2013.01); *Y02B 90/18* (2013.01)
USPC ....................................................... 429/122

(56) References Cited

U.S. PATENT DOCUMENTS

| | | | | |
|---|---|---|---|---|
| 2002/0094467 | A1* | 7/2002 | Nonobe et al. | 429/34 |
| 2003/0022041 | A1* | 1/2003 | Barton et al. | 429/23 |
| 2004/0005487 | A1* | 1/2004 | Matoba | 429/22 |
| 2004/0175598 | A1* | 9/2004 | Bliven et al. | 429/12 |
| 2004/0229088 | A1* | 11/2004 | Hayashi et al. | 429/13 |
| 2004/0241512 | A1* | 12/2004 | Muto et al. | 429/23 |
| 2006/0110635 | A1* | 5/2006 | Saito | 429/13 |

FOREIGN PATENT DOCUMENTS

| | | |
|---|---|---|
| JP | 2002-093438 | 3/2002 |
| JP | 2002-093448 | 3/2002 |
| JP | 2002-164065 | 6/2002 |
| JP | 2003-115314 | 4/2003 |
| JP | 2004-536438 | 12/2004 |
| WO | 03/010845 A | 2/2003 |
| WO | 03/010845 A2 | 2/2003 |
| WO | 2005/031901 A | 4/2005 |
| WO | 2005/031901 A2 | 4/2005 |
| WO | 2005/055353 A | 6/2005 |
| WO | 2005/055353 A1 | 6/2005 |

OTHER PUBLICATIONS

International Search Report issued on Jul. 25, 2006 for International Application No. PCT/JP2006/309977.

The above references were cited in a European office action issued on Nov. 11, 2011, a copy of which is enclosed, that issued in the corresponding European Patent Application No. 06746643.3.

* cited by examiner

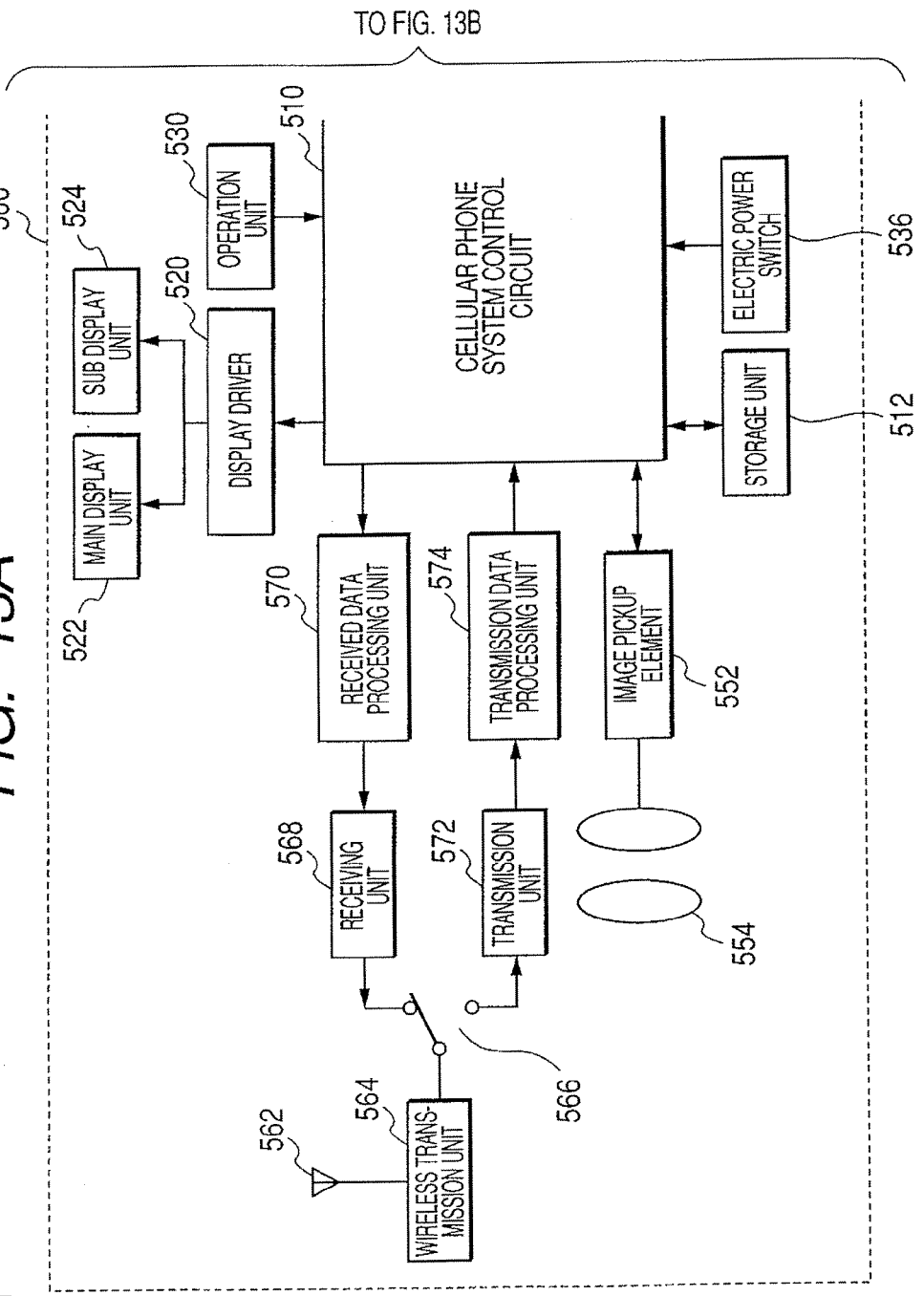

ELECTRONIC APPARATUS, CONTROL METHOD AND PROGRAM THEREOF, AND BATTERY FOR OPERATING ELECTRONIC APPARATUS

TECHNICAL FIELD

The present invention relates to an electronic apparatus capable of using a fuel cell as a power source, and its control method and program, and more particularly to an electronic apparatus mounting a fuel cell which recovers a power generation efficiency through purge, and its control method and program.

BACKGROUND ART

Presently, there are many apparatus which can operate by a power supply from a battery. Among these apparatus, an apparatus capable of being used outdoors has a big issue of a battery life of power supply.

In the following, description will be made by referring to a digital camera as one example of electronic apparatus capable of being used outdoors.

In a generally known digital camera, an object image taken through a photographing is photoelectrically converted by an image pickup device into an image signal, the image signal is A/D converted and recorded on a recording medium, and an image can be displayed on a built-in liquid crystal monitor.

Particularly, a single-lens reflex digital camera capable of exchanging a photographing is required to have a high quality of a photographed image, a wide luminance range of an object capable of being photographed and the like, while a good manipulation performance and a high speed continuous photographing performance are also maintained similar to a silver salt film camera. It is therefore essential that a high sensitivity image pickup device which has a large number of pixels is adopted. In addition, as compared to a silver salt film camera, large scale electronic circuits using a number of electric components are additionally used, including an image pickup circuit, an image processing circuit, an image display circuit and the like. Therefore, a consumption power becomes large and it is required to have a battery capable of supplying a sufficient energy. While compactness and lightness of cameras advance, conventional primary and secondary batteries are becoming difficult to supply cameras with a sufficient drive energy.

In order to solve these problems, a compact fuel cell has been paid attention. In a fuel cell, fuel gas such as hydrogen as a reaction gas is electrochemically reacted with oxidant gas such as oxygen contained in an atmospheric air, to thereby convert chemical energy contained in the fuel, directly into electric energy.

Next, description will be made on a power generation principle of a fuel cell. In a fuel cell, fuel gas containing hydrogen is supplied to a fuel electrode and oxidant gas containing oxygen is supplied to an oxygen electrode to thereby obtain an electromotive force through electrochemical reactions occurring between both the electrodes. Hydrogen supplied to the fuel electrode is separated by catalyst into protons and electrons. The separated electrons move to the oxygen electrode via an outer circuit, whereas the protons move to the oxygen electrode via a solid state polymer film. At the oxygen electrode, protons, electrons and oxygen are coupled to generate water and carbon dioxide. In the following, the electrochemical reactions in the fuel cell are shown. A formula (1) indicates a reaction at the fuel electrode, a formula (2) indicates a reaction at the oxygen electrode, and a formula (3) indicates a reaction in the whole battery.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

Fuel batteries are classified into various types depending upon an electrolyte difference and the like. One know type is a fuel cell which uses a solid state polymer film as electrolyte. A solid state polymer electrolyte type fuel cell can realize low cost, is easy to make compact and light, and has a high output density in view of a battery performance. From these reasons, the fuel cell of this type is desired to be a drive electric power source not only for cameras, but also for portable electronic apparatus such as note type personal computers, mobile phones and PDAs. A stack cell type fuel cell has also been proposed, having a structure that a plurality of power generation cells and separators are alternately laminated.

FIG. 11 is a diagram showing a change in an output voltage of a fuel cell in use. FIG. 12 is a diagram showing a change in an output voltage of a fuel cell in use under purge. As a power is generated by a fuel cell for a long period of time, an output voltage lowers. This is because water generated by a reaction between hydrogen and oxygen diffuses in a reverse direction to the fuel electrode and reduces a power generation area, and in addition, gas unnecessary for power generation remains at the fuel electrode and lowers a hydrogen partial pressure. Since a fuel cell is used as a current supply source of an electronic apparatus, it is not preferable that an output voltage lowers to an allowable voltage range of the electronic apparatus or more.

In order to solve this, generally a flow rate of hydrogen to be supplied to the fuel electrode is increased instantly to discharge moisture and gas which are unnecessary for power generation and remain at the fuel electrode, to an external of stack cells, so that a power generation area is recovered and a hydrogen partial pressure is raised to thereby stabilize an output voltage (a purge method). After purge, an output voltage of the fuel cell rises as shown in FIG. 12.

Several techniques have been disclosed as methods of judging the timing when a fuel cell is purged. According to one method, voltages of all stack cells constituting a fuel cell are detected, and when any one layer of cells presents a predetermined voltage or lower, purge is effected (for example, refer to JP-A-2002-093438). There are a method of forcibly effecting purge each time a predetermined time lapses (for example, refer to JP-A-2000-215905) and a method of performing both periodical purge and hydrogen purge upon voltage measurement of each cell (for example, refer to JP-A-2003-115314). Other methods include a method (for example, refer to JP-A-2002-164065) of measuring voltage and current output from a fuel cell for a predetermined period or by a predetermined number of samples, calculating an internal resistance from the measured value, comparing the internal resistance with a preset standard value, and estimating the state of electrolyte of the fuel cell to effect purge when necessary.

However, although purge is effected to recover the power generation area, raise the hydrogen partial pressure and stabilize the output voltage, an output voltage of the fuel cell lowers momentarily during purge because of air mixture to the fuel electrode by reverse diffusion, drop of hydrogen pressure and temperature in the fuel electrode. A portable electronic apparatus such as a digital camera is required to have a severe precision of management of a power source system. For example, if the timing when the fuel cell is purged is superposed upon the timing when the electronic apparatus requires a relatively large power, the power necessary for the electronic apparatus cannot be drawn from the fuel cell, and there arises a problem of an insufficient power of the electronic apparatus.

If an electronic apparatus is remained unused for a long term, fuel gas leaks minutely from the fuel electrode of a fuel cell, so that a hydrogen concentration on the fuel electrode side falls. When the fuel cell is thereafter activated, there arises a problem that it takes a long time to raise the output voltage to a necessary voltage.

DISCLOSURE OF THE INVENTION

The present invention has been made in consideration of the above situation, and has as its object to provide an electronic apparatus capable of purging a fuel cell at an optimum timing suitable for the apparatus state, its control method and program, and a battery for operating the electronic apparatus.

According to the present invention, the foregoing object is attained by providing an electronic apparatus using, as at least one electric power source, a fuel cell having an electric power output unit for outputting an electric power through a chemical reaction between fuel gas and oxidant gas, a purge device for purging the electric power output unit and a purge control unit for issuing a purge instruction to the purge device, the electronic apparatus comprising: a monitor unit for monitoring a consumption power, an operation state or a manipulated state of the electronic apparatus; and a purge permission unit for judging from an output of the monitor unit whether the purge control unit is permitted to issue the purge instruction, and outputting a judgment result to the purge control unit.

According to the present invention, the foregoing object is also attained by providing a control method for an electronic apparatus using, as at least one electric power source, a fuel cell having an electric power output unit for outputting an electric power through a chemical reaction between fuel gas and oxidant gas, a purge device for purging the electric power output unit and a purge control unit for issuing a purge instruction to the purge device, the control method comprising steps of: monitoring a consumption power, an operation state or a manipulated state of the electronic apparatus; judging from a monitor result by the monitoring step whether the purge control unit is permitted to issue the purge instruction; and outputting a judgment result by the judging step to the purge control unit.

According to the present invention, the foregoing object is also attained by providing a fuel cell unit comprising: an electric power output unit for outputting an electric power through a chemical reaction between fuel gas and oxidant gas; a purge device for purging the electric power output unit; and a purge control unit for issuing a purge instruction to the purge device, in accordance with a permission signal from an electronic apparatus to be driven.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the present invention and, together with the description, serve to explain the principles of the invention.

BEST MODE FOR CARRYING OUT THE INVENTION

Preferred embodiments of the present invention will be described in detail in accordance with the accompanying drawings.

As a portable electronic apparatus adopting the present invention, a single-lens reflex digital camera is referred to for describing the following embodiments.

Figures 1, 1A:
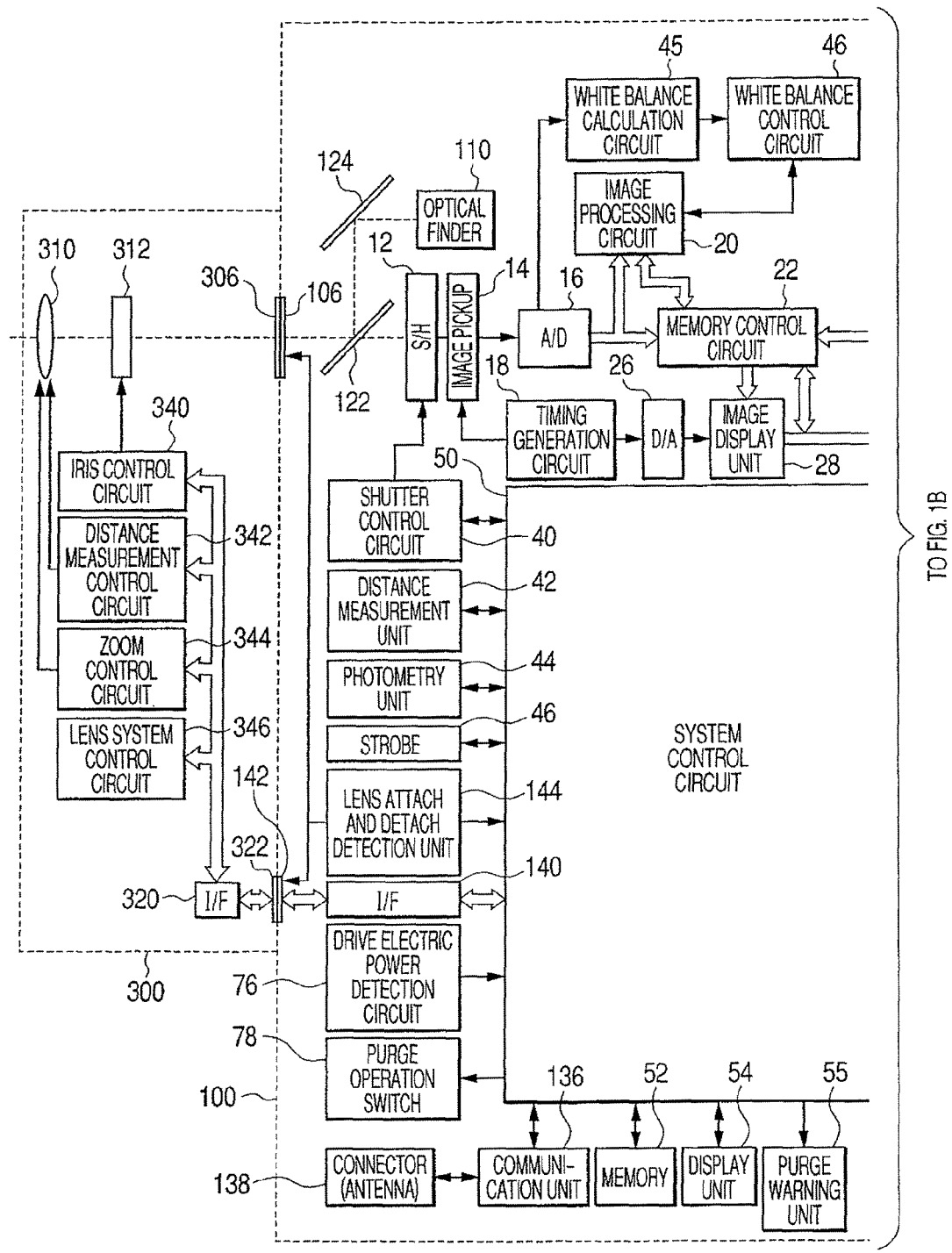
FIG. 1 is comprised of FIGS. 1A and 1B are block diagrams showing the internal structure of a single-lens reflex digital camera according to an embodiment of the present invention.
Figure 1B:
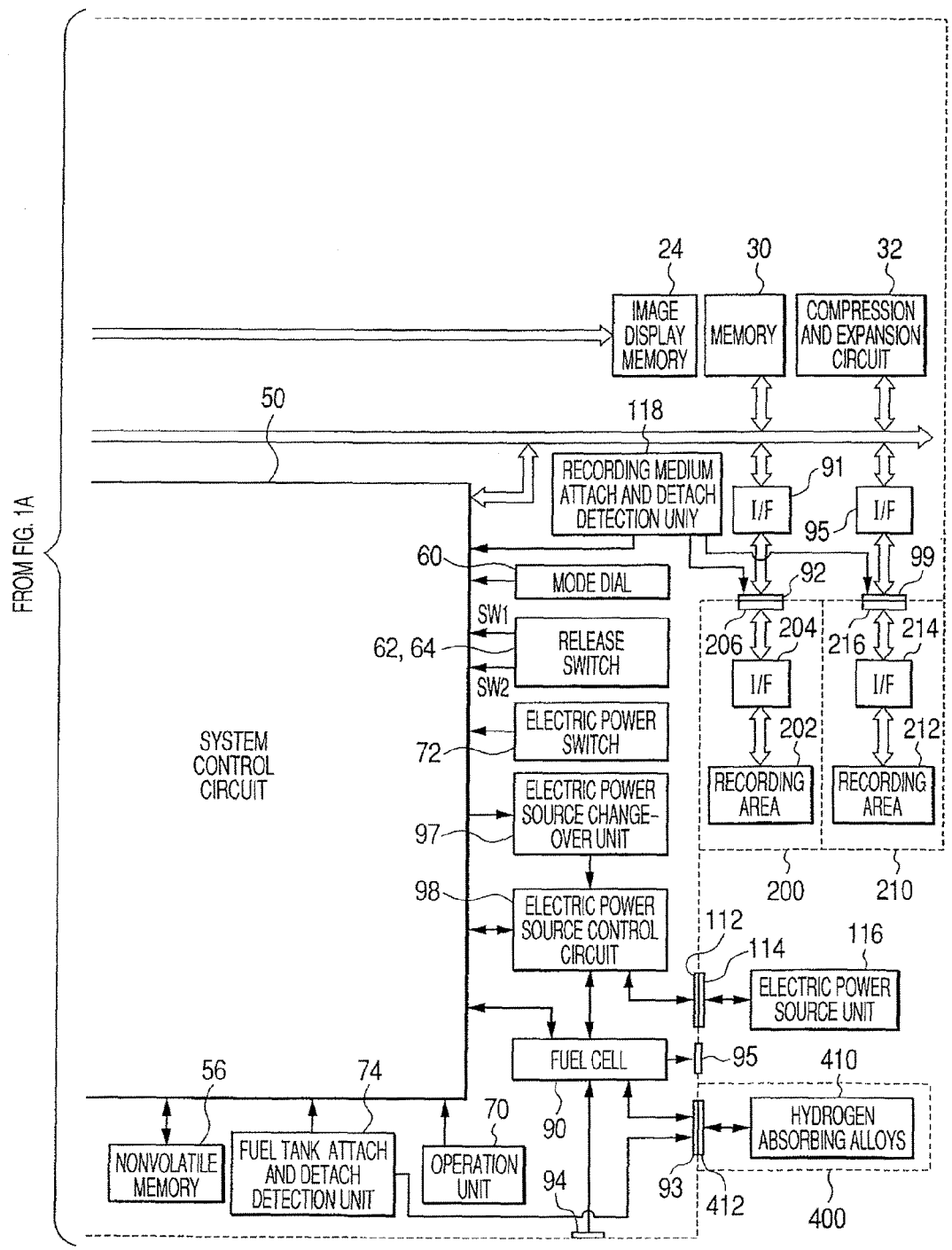

FIGS. 1A and 1B are block diagrams showing the internal structure of a single-lens reflex digital camera according to an embodiment of the present invention.

As shown in FIGS. 1A and 1B, a single-lens reflex digital camera of the embodiment is constituted of: an electronic camera main body 100 constituting the single-lens reflex digital camera main body; a photographing unit 300 including a taking optical system constituted of a plurality of photographing 310 and the like; recording media 200 and 210; an electric power source unit 116; and a fuel tank (hydrogen supply source unit) 400. The recording media 200 and 210;

electric power source unit 116 and fuel tank 400 are detachably mounted on the single-lens reflex digital camera.

The photographing unit 300 includes a drive unit for driving the photographing 310, light amount limiting means for adjusting an amount of incidence light beams transmitted through the photographing 310, and the like. The photographing unit 300 is detachably mounted on the camera main body 100.

The camera main body 100 is structured in the following manner.

Reference numeral 12 denotes a shutter for controlling an exposure amount of an image pickup device 14. The image pickup device 14 converts an optical image into an electric signal, and is, for example, a CCD sensor. A light beam incident upon the photographing 310 is directed by an iris 312 as light amount limiting means, lens mounts 306 and 106, a mirror 122 and the shutter 12, and focused as an optical image on an image pickup plane of the image pickup device 14.

The light beam incident upon the image pickup lenses 310 is directed to an optical finder 110 by the mirrors 122 and 124. The mirror 122 may be of a quick return mirror structure or of a half mirror structure.

Reference numeral 16 denotes an A/D converter for converting an analog signal output from the image pickup device 14 into a digital signal (hereinafter called image data). Reference numeral 18 denotes a timing generator circuit for supplying the image pickup device 14, A/D converter 16 and a D/A converter 26 with a clock signal and a control signal, the timing generator circuit being controlled by a memory control circuit 22 and a system control circuit 50.

Reference numeral 20 denotes an image processing circuit for effecting a predetermined pixel interpolation process and color conversion process for image data from the A/D converter 16 and image data from the memory control circuit 22. In the image processing circuit 20, a predetermined calculation process is effected by using image data when necessary, and in accordance with the calculation result, the system control circuit 50 effects a through-the-lens (TTL) type auto focus (AF) process for a distance measurement unit 42 and a photometry unit 44, an automatic exposure (AE) control process and an electronic flash (EF) process. The image processing circuit 20 further effects a white balance (WB) process in accordance with the calculation result in a white balance control circuit 46.

The memory control circuit 22 controls the A/D converter 16, the timing generator circuit 18, the image processing circuit 20, an image display memory 24, the D/A converter 26, a memory 10, and a compression/expansion circuit 32. Image data output from the A/D converter 16 is written into the image display memory 24 or memory 30 via the image processing circuit 20 and memory control circuit 22 or via only the memory control circuit 22.

The image display memory 24, the D/A converter 26 and an image display unit 28 as a TFT/LCD for example, effect an image display process. More specifically, display image data written in the image display memory 24 is output to and displayed on the image display unit 28 via the D/A converter 26. If image data photographed with the image pickup device 14 is sequentially displayed on the image display unit 28, an electronic view finder function can be realized. The image display unit 28 can turn on/off a display as desired in accordance with an instruction from the system control unit 50. When a display is turned off, a consumption power of the electronic camera main body 100 can be reduced considerably.

The memory 30 is a storage medium for storing photographed still images and moving images, and has a capacity sufficient for storing a predetermined number of still images, and moving images for a predetermined time. Therefore, even in continuously photographing a plurality of still images and in panorama photographing, high speed and large capacity image write is executed relative to the memory 30. The memory 30 can be used as a working area of the system control circuit 50.

The compression/expansion circuit 32 compresses and expands image data through adaptive discrete cosine transform (ADCT) or the like. The compression/expansion circuit 32 reads image data stored in the memory 30, executes the compression or expansion process, and writes the processed image data into the memory 30.

Reference numeral 40 denotes a shutter control circuit for controlling the shutter 12 in accordance with photometry information from the photometry unit 44, in corporation with an iris control circuit 340 for controlling an iris 312. The distance measurement unit 42 executes the auto focus (AF) process. The distance measurement unit can measure an in-focus state of an image focused as an optical image, by making a light beam incident upon the lenses 310 enter the distance measurement unit 42 via the iris 312, lens mounts 306 and 106, mirror 122 and a distance measurement sub-mirror (not shown).

The photometry unit 44 executes the automatic exposure (AE) process. The photometry unit can measure an exposure state of an image focused as an optical image, by making a light beam incident upon the lenses 310 enter the photometry unit 44 via the iris 312, lens mounts 306 and 106, mirror 122 and a photometry lens (not shown).

Reference numeral 45 denotes a white balance calculation circuit for calculating a color temperature by using image data of an image photographed with a TTL method. The white balance control circuit 46 calculates white balance correction data necessary for the image processing circuit 20 to execute the white balance process, in accordance with a gain or the like for white balance adjustment preset in accordance with a light source selection and a color temperature input by a photographer.

Reference numeral 48 denotes an electronic flash having a projection function for AF supplementary light and an electronic flash light modulation function. In accordance with calculation results, by the image processing circuit 20, of image data of an image photographed with the image pickup device 14, the system control circuit 50 controls the shutter control circuit 40, the iris control circuit 340 and a distance measurement control circuit 342. Exposure control and auto focus (AF) control can be made by using a video TTL method. The auto focus (AF) control may be made by using both the measurement results of the distance measurement unit 42 and calculation results in the image processing circuit 20 of image data of an image photographed with the image pickup device 14. The exposure control may be made by using both the measurement results of the photometry unit 44 and calculation results in the image processing circuit of image data of an image photographed with the image pickup device 14.

Reference numeral 50 denotes a system control circuit for controlling the entirety of the electronic camera main body 100, and reference numeral 52 denotes a: memory for storing operation constants, variables and programs for the system control circuit 50.

Reference numeral 54 denotes a display unit having a display function of, for example, a liquid crystal display for displaying an operation state and a message by using characters, images, sounds and the like and a sound reproducing function of, for example, a speaker for reproducing an operation sound and an alarm sound, in accordance with the execution of a program in the system control circuit 50. One or a plurality of display units 54 are mounted at positions easy to view such as positions near an operation unit of the electronic camera main body 100. For example, the display units are constituted of LCDs, LEDs, sound generator devices and the like.

Operation means for the single-lens reflex digital camera will be described specifically. Of the display contents on the display unit 54, displays on LCD or the like include: a single shot—continuous photographing display; a self timer display; a compression factor display; a record pixel number display; a record photograph frame number display; a remaining photograph frame number display; a shutter speed display; an iris value display; an exposure correction display; a flash display; a red-eye relax display; a macro photographing display; a buzzer setting display; a remaining clock battery capacity display; a remaining battery capacity display; an error display; an information display by a plurality of digits of numerical values; an attach and detach state display for the recording media 200 and 210; an attach and detach state display for the photographing unit 300; a communication I/F operation display; a date and time display; a connection state display for an external computer; and other displays.

Of display contents on the display unit 54, displays on the optical finder 110 include: an in-focus display; a photographing preparation complete display; a hand shaking alarm display; a flash charge display; a flash charge complete display; a shutter speed display; an iris value display; an exposure correction display; a record medium write operation display; and other displays. Of display contents on the display unit 54, displays on LED or the like include: an in-focus display; a photographing preparation complete display; a hand shaking alarm display; a flash charge display; a flash charge complete display; a record medium write operation display; a macro photographing setting notice display; a secondary battery charge state display; and other displays. Of display contents on the display unit 54, displays on a lamp or the like include a self timer notice display. A self timer notice lamp may be used as an AF supplementary light source.

Reference numeral 55 denotes a purge alarm unit for alarming a user to operate a purge operation switch 78 when an output voltage of the fuel cell 80 lowers and purge becomes necessary. The details will be later described. Purge means a method of increasing rapidly a flow rate of hydrogen to be supplied to the fuel electrode of a fuel cell, and discharging moisture and unnecessary gas remaining at the fuel electrode to an external of stack cells to thereby recover the power generation area and raise the hydrogen partial pressure.

Reference numeral 56 denotes an electrically erasable and recordable nonvolatile memory for recording the contents in the memory 52 when necessary. For example, the nonvolatile memory is an EEPROM or the like. A mode dial 60, a release switch SW1 62, a release switch SW2 64 and a white balance select switch 66 constitute operation means for inputting various operation instructions for the system control circuit 50. The operation means is constituted of a single or a plurality of combinations of a switch, a dial, a touch panel, a pointing device for line-of-view detection, a voice recognition apparatus and the like.

The operation means will be described specifically. The mode dial 60 is a rotary switch capable of changing over various photographing modes including: an automatic photographing mode; a program photographing mode; a shutter speed priority photographing mode; an iris priority photographing mode; a manual photographing mode; a focal depth priority (depth) photographing mode; a portrait photographing mode; a scene photographing mode; a close-up photographing mode; a sport photographing mode; a night scene photographing mode; a panorama photographing mode; and the like.

The release switch SW1 62 turns on at the intermediate state of depressing a release button (not shown) to instruct a start of the operation of the auto focus (AF) process, an automatic exposure (AE) process, a white balance (WB) process, an electronic flash (EF) process and the like. The release switch SW2 64 turns on at the completion state of depressing the release button (not shown) to instruct a start of a series of processes including an exposure process of writing image data read from the image pickup device 12 into the memory 30 via the A/D converter 16 and memory control circuit 22, a development process using calculations by the image processing circuit 20 and memory control circuit 22, and a record process of reading image data from the memory 30, compressing the image data at the compression/expansion circuit 32, and writing the image data in the recording medium 200 or 210.

Reference numeral 70 denotes an operation unit constituted of various buttons, touch panels and the like. For example, the operation unit is constituted of a menu button, a set button, a macro button, a multi-screen reproduction change-over page button, a flash setting button, a single shot—continuous photographing—self timer change button, a menu shift plus (+) button, a menu shift minus (−) button, a photographing image quality select button, an exposure correction button, a date and time setting button, a select and change-over button, a decision and execution button, an image display on/off switch, a quick review on/off switch, a compression mode switch, a reproduction switch, an AF mode setting switch, a white balance select switch and the like.

The select and change-over button is used for setting a selection or a change of various functions when photographing and reproduction in a panorama mode are effected. The decision and execution button is used for setting a decision and execution of various functions when photographing and reproduction in a panorama mode are effected. The image display on/off switch is used for turning on/off the image display unit 28. The quick review on/off switch is used for setting a quick review function of automatically reproducing image data of an image immediately after photographing. The compression mode switch is used for selecting a compression factor of JPEG compression or for selecting a CCD/RAW mode for digitalizing directly image data output from the image pickup device and recording the image data in the recording medium.

The reproduction switch can set various functional modes including a reproduction mode, a photographing state defective image reproduction mode, a PC connection mode and the like. The AF mode setting switch can set a one-shot AF mode in which an auto focus operation is stopped once when the release switch SW1 62 is depressed and an in-focus state is maintained if an in-focus state is obtained, and a servo AF mode in which an auto focus operation continues while the release switch SW1 62 is depressed.

The white balance select switch is used for selecting an auto white balance and a manual white balance. In the auto white balance, a color of external light is calculated from the output signal of the image pickup device 14, and the white balance is adjusted by a TTL method using color temperature data. In the manual white balance, a photographer judges the type (e.g., sun light, electric bulb, fluorescent lamp or the like) of a light source in a photographing environment, selects the type of the light source by using a light source select button (not shown), or the photographer measures a color hue (color temperature) of the photographing environment, inputs a color temperature of the photographing environment into the electronic camera by using a color temperature input button, and the gains of a red signal input circuit and a blue signal input circuits are set to the preset fixed gains specific to the light source and color temperature, in accordance with selection of the light source and input of the color temperature.

If the plus button and minus button are provided with a rotary dial switch, the functions and numerical values of the buttons can be more smoothly selected.

Reference numeral 72 denotes an electric power switch which can switch between a power-on and power-off of the electronic camera main body 100. It is also possible to switch between a power-on and power-off of various components connected to the electronic camera main body 100 including the photographing unit 300, an external electronic flash, the recording media 200 and 210, and the like. Reference numeral 74 denotes a fuel tank attach and detach detection unit for detecting whether the fuel tank 400 is attached to a connector 93.

Reference numeral 76 denotes a drive electric power detection circuit for detecting a drive electric power for the electronic camera main body 100. Reference numeral 78 denotes a purge operation switch. When this switch is turned on, the system control circuit 50 controls the fuel cell 80 to effect purge. The detailed structure of the fuel cell 80 will be later given.

The fuel cell 80 supplies an electric power to the electronic camera main body 100. Reference numerals 93 and 412 denote connectors for connecting the electronic camera main body 100 and a fuel tank 400 for storing fuel gas (hydrogen) of the fuel cell 80. Reference numeral 94 denotes a suction port for sending air to the oxygen electrode (not shown) of the fuel cell 80. Reference numeral 96 denotes an exhaust port for discharging hydrogen and impurities and the air used in the fuel cell 80 from the electronic camera main body 100 to an external, when purge of the fuel cell is effected. Reference numeral 97 denotes an electric power source change-over unit for switching the electric power source of the electronic camera main body 100 from the fuel cell 80 to the electric power source unit 116, or from the electric power source unit 116 to the fuel cell 80, under the control of the system control circuit 50.

Reference numeral 98 denotes an electric power source control circuit which is constituted of a battery detection circuit, a DC/DC converter, a switch circuit for switching between blocks to be supplied with an electric power. The electric power source control circuit detects the type of a battery and a remaining battery capacity, controls the DC/DC converter in accordance with the detection results or an instruction from the system control circuit 50, and supplies a necessary voltage to each component, including the recording media during a necessary period. Reference numerals 112 and 114 denote connectors for connecting the electronic camera main body 100 and electric power source unit 116. The electric power source unit 116 is constituted of a primary battery such as an alkali battery and a lithium battery, a secondary battery such as a NiCd battery, an NiMH battery and a Li battery, an AC adapter and the like.

Reference numerals 91 and 95 denote interfaces with the recording media such as a memory card and a hard disc. Reference numerals 92 and 99 denote connectors for connection of the recording media such as a memory card and a hard disc. Reference numeral 118 denotes a recording media attach and detach detection unit for detecting whether the recording medium 200 or 210 is connected to the connectors 92 and 99. In this embodiment, description will be made assuming that two series of interfaces and connectors are provided for mounting the recording media. A single or a plurality of series may be used obviously for the interfaces and connectors for mounting the recording media. A combination of interfaces and connectors having different specifications may also be used.

The specifications of the interfaces and connectors may be those in conformity with the specifications of PCMCIA cards, CF (compact flash) cards or the like. If the interfaces 91 and 95 and connectors 92 and 99 are in conformity with the specifications of PCMCIA cards or CF (compact flash) cards and if various communication cards such as LAN cards, modem cards, USB cards, IEEE1394 cards, P1284 cards, SCSI cards and PHS cards are used, then image data and management information added to the image data can be transferred to and from other computers and peripheral apparatus such as printers.

Reference numeral 136 denotes a communication unit having various communication functions such as RS232, USB, IEEE1394, P1284, SCSI, modems, LAN and wireless communications. Reference numeral 138 denotes a connector for connecting the electronic camera main body 100 to another apparatus via the communication unit 136, or an antenna for wireless communications.

Reference numeral 140 denotes an interface for connecting the electronic camera main body 100 to the photographing unit 300 in the lens mount 106. Reference numeral 142 denotes a connector for electrically connecting the electronic camera main body 100 to the photographing unit 300. Reference numeral 144 denotes a lens attach and detach detection unit for detecting whether the photographing unit 300 is attached to the lens mount 106 and/or connector 142.

The connector 142 has a function of transferring a control signal, a state signal, a data signal and the like between the electronic camera main body 100 and photographing unit 300 and supplying various voltages and currents. The connector 142 may provide not only the electric communications but also optical communications and audio communications.

Reference numeral 200 denotes a recording medium such as a memory card and a hard disc. The recording medium 200 is constituted of a recording area 202 made of a semiconductor memory, a magnetic disk or the like, an interface 204 with the electronic camera main body 100, and a connector 206 for connection to the electronic camera main body 100.

Reference numeral 210 denotes a recording medium such as a memory card and a hard disc. The recording medium 210 is constituted of a recording area 212 made of a semiconductor memory, a magnetic disk or the like, an interface 214 with the electronic camera main body 100, and a connector 216 for connection to the electronic camera main body 100.

The above-described photographing unit 300 will be described in more detail. As described above, the photographing unit 300 is of a lens exchangeable type.

The lens mount 306 mechanically couples the photographing unit 300 to the electronic camera main body 100. The lens mount 306 has various functions of electrically connecting the photographing unit 300 to the electronic camera main body 100.

Reference numeral 320 denotes an interface for connection of the photographing unit 300 to the electronic camera main body 100 in the lens mount 306. Reference numeral 322 denotes a connector for electrically connecting the photographing unit 300 to the electronic camera main body 100. The connector 322 has a function of transferring a control signal, a state signal, a data signal and the like between the electronic camera main body 100 and photographing unit 300 and supplying or being supplied with various voltages and currents. The connector 322 may provide not only the electric communications but also optical communications and audio communications.

The iris control circuit 340 controls the iris 312 in accordance with photometry information supplied from the photometry unit 44, in corporation with the shutter control circuit 40 for controlling the shutter 12. The distance measurement control circuit 342 controls focusing of the photographing 310. The zoom control circuit 346 controls the whole of the photographing unit 300. The lens system control circuit 346 provides a memory function of storing operation constants, variables, programs and the like and a nonvolatile memory function of storing identification information on a number specific to the photographing unit 300, management information, and functional information such as an open iris value, a minimum iris value, a focal distance and the like, various present and past setting values and the like.

Next, the details of the fuel tank 400 will be described. The fuel tank 400 is constituted of hydrogen absorbing alloy 410 and a connector 412. The hydrogen absorbing alloy 410 contains fuel gas (hydrogen) necessary for driving the fuel cell 80. The connector 412 connects the fuel tank 400 to the electronic camera main body 100. The hydrogen absorbing alloy 410 adjusts a hydrogen pressure in the fuel cell to be always constant, and sends fuel gas (hydrogen) to the fuel cell 80 via the connectors 93 and 412.

Figure 2:
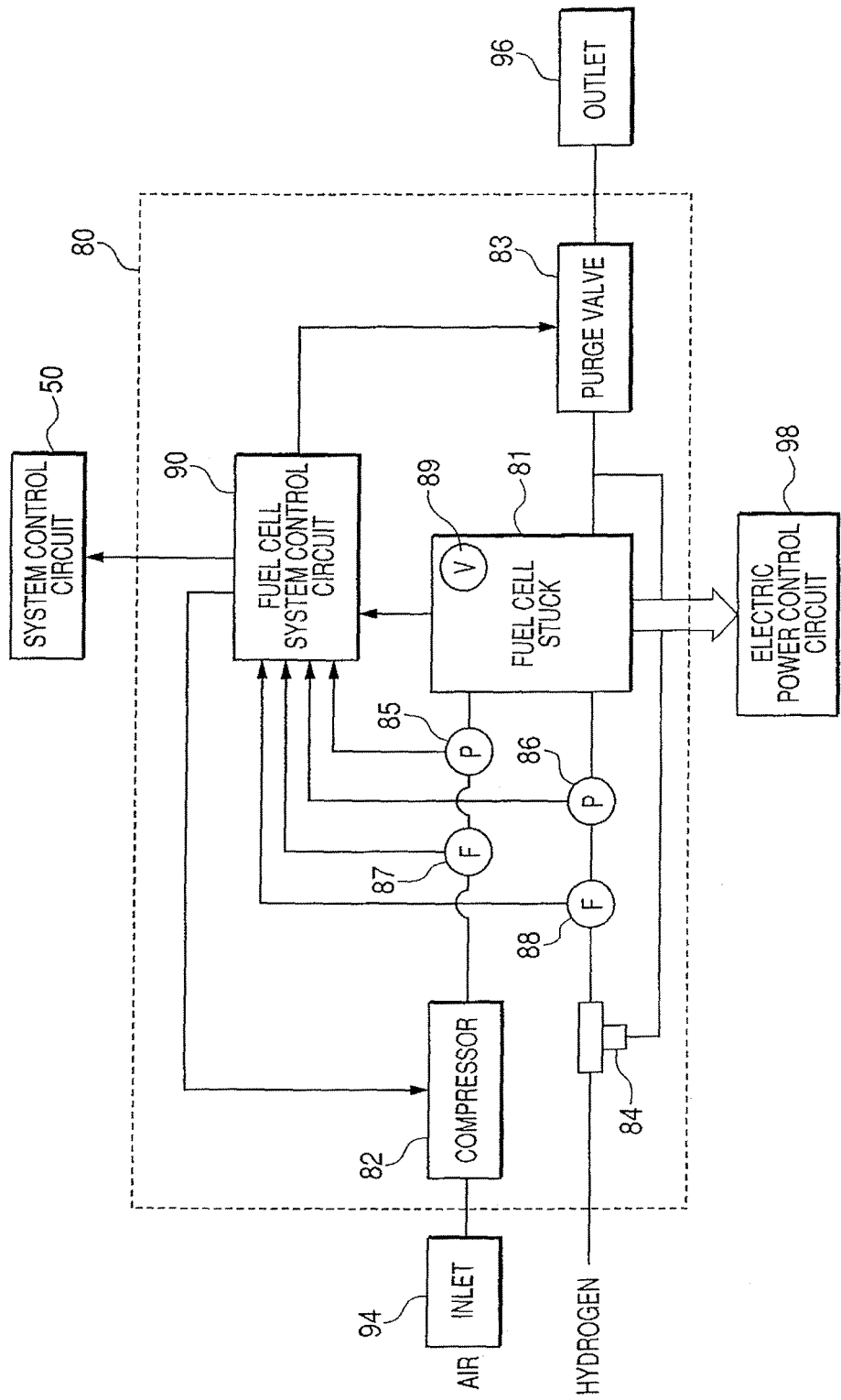
FIG. 2 is a block diagram showing an example of the internal structure of a fuel cell 80 mounted in the single-lens reflex digital camera shown in FIGS. 1A and 1B.

Next, description will be made on the structure of the fuel cell 80 mounted on the electronic camera main body 100 shown in FIGS. 1A and 1B. FIG. 2 is a block diagram showing an example of the internal structure of the fuel cell 80 mounted on the single-lens reflex digital camera shown in FIGS. 1A and 1B. In FIG. 2, identical reference numerals to those shown in FIGS. 1A and 1B indicate the components having similar functions.

In FIG. 2, reference numeral 81 denotes a fuel cell stack constituted of a plurality of cells. Reference numeral 82 denotes a compressor for compressing air sucked from the suction port 94 and sending the compressed air to the oxygen electrode (not shown) of the fuel cell stack 81. Reference numeral 83 denotes a purge valve as purge means for discharging circulating hydrogen to an external of the electronic camera main body 100 via the exhaust port 96, and discharging water and impurities accumulated in the fuel cell stack 81 to thereby effect purge.

Reference numeral 84 denotes an ejector for circulating fuel gas (hydrogen) discharged from the fuel cell stack 81. Reference numeral 85 denotes a sensor for measuring a pressure of the oxidant gas (air). Reference numeral 86 denotes a sensor for measuring a pressure of the fuel gas (hydrogen). Reference numeral 87 denotes a sensor for measuring a flow rate of the oxidant gas. Reference numeral 88 denotes a sensor for measuring a flow rate of the fuel gas (hydrogen).

Reference numeral 89 denotes a cell voltage detection circuit for measuring a voltage of each cell in the fuel cell stack 81. Although only one cell voltage detection circuit 89 is shown in FIG. 2 for the purposes of simplicity, the cell voltage detection circuit is provided for each cell or for each cell group in the fuel cell stack 81. It is desired to detect a cell voltage in this manner when an output of the fuel cell is measured. A voltage detection circuit may be provided to measure an output voltage on the electronic apparatus side.

Reference numeral 90 denotes a fuel cell system control circuit for controlling the compressor 82 and the like to obtain a target electric power amount, in accordance with an input pressure and flow rate of the fuel gas (hydrogen) and an input pressure and flow rate of the oxidant gas (air). An output of the cell voltage detection circuit 89 is sent to the system control circuit 50 of the electronic camera main body 100, and when a purge instruction is received from the system control circuit 50, purge is effected by driving the purge valve 83 as purge control means.

Next, description will be made on the control operation for the fuel cell 80 of the single-lens reflex digital camera shown in FIGS. 1A, 1B and 2.

Figure 3:
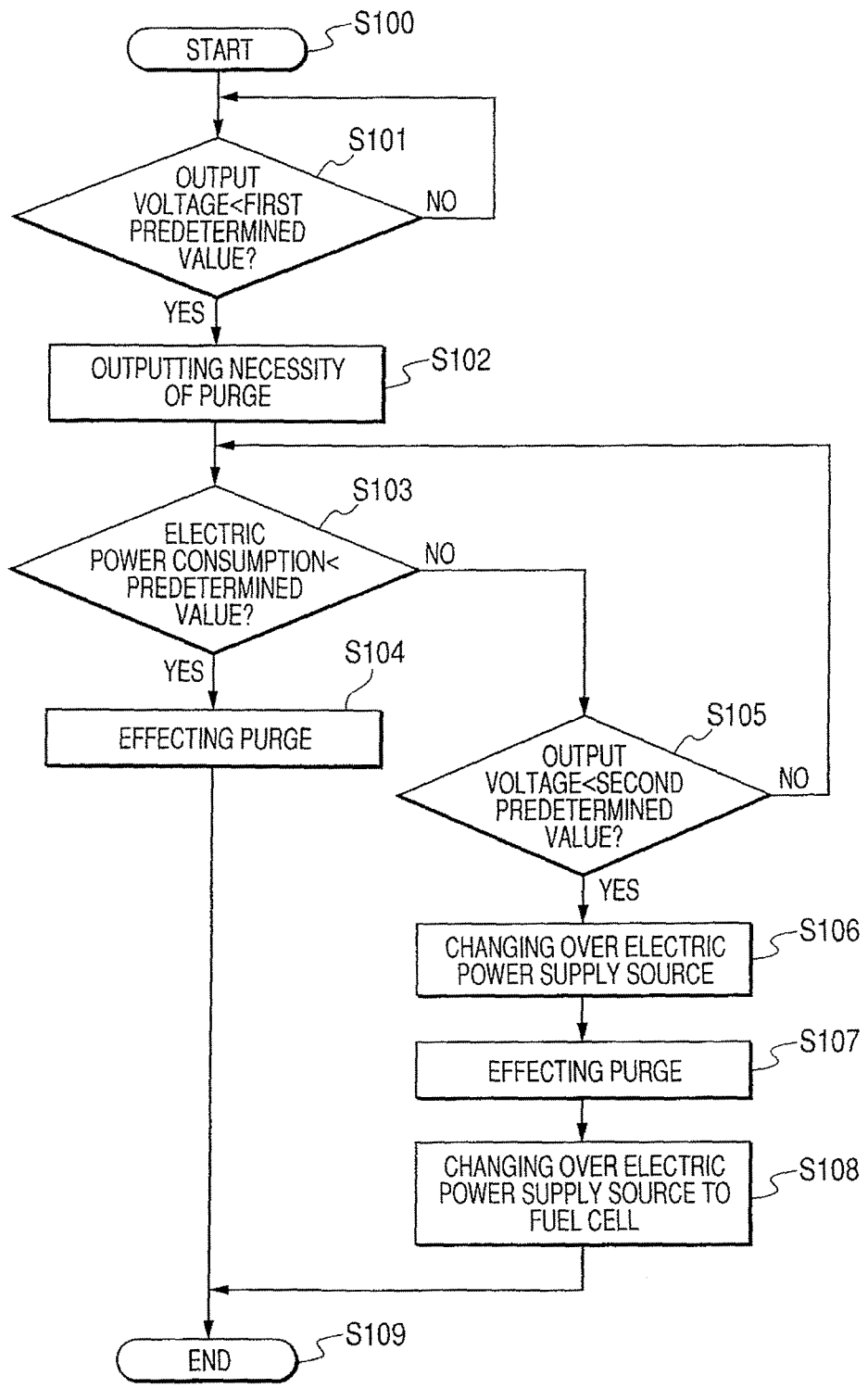
FIG. 3 is a flow chart illustrating a control operation for the fuel cell 80 of the single-lens reflex digital camera shown in FIGS. 1A, 1B and 2.

FIG. 3 is a flow chart illustrating the control operation for the fuel cell 80 of the single-lens reflex digital camera shown in FIGS. 1A, 1B and 2. As shown in FIG. 3, first, while the electronic camera main body 100 is driven by using the fuel cell 80 as electric power supply means, the fuel cell system control circuit 90 makes the cell voltage detection circuit 89 measure a cell voltage of the fuel cell stack 81, and it is judged whether the cell voltage is lower than a first predetermined value necessary for purge (Step S101).

If it is judged that the cell voltage is higher than the first predetermined value (NO at Step S101), the flow returns to Step 101 whereat the fuel cell system control circuit 90 makes the cell voltage detection circuit 89 measures a cell voltage of the fuel cell stack 81. Step S101 is repeated until the cell voltage becomes lower than the first predetermined value.

If it is judged that the cell voltage is lower than the first predetermined value (YES at Step S101), the fuel cell system control circuit 90 notifies the system control circuit 50 of that the cell voltage became lower than the first predetermined value and purge is necessary (Step S102). The system control circuit 50 judges from a detection result of the drive electric power detection circuit 76 whether a drive electric power of the electronic camera main body 100 is lower than a predetermined value (Step S103). This predetermined value is set to a level at which the operation of the electronic camera main body 100 is not influenced even if a voltage drop occurs during purge.

Figure 4:
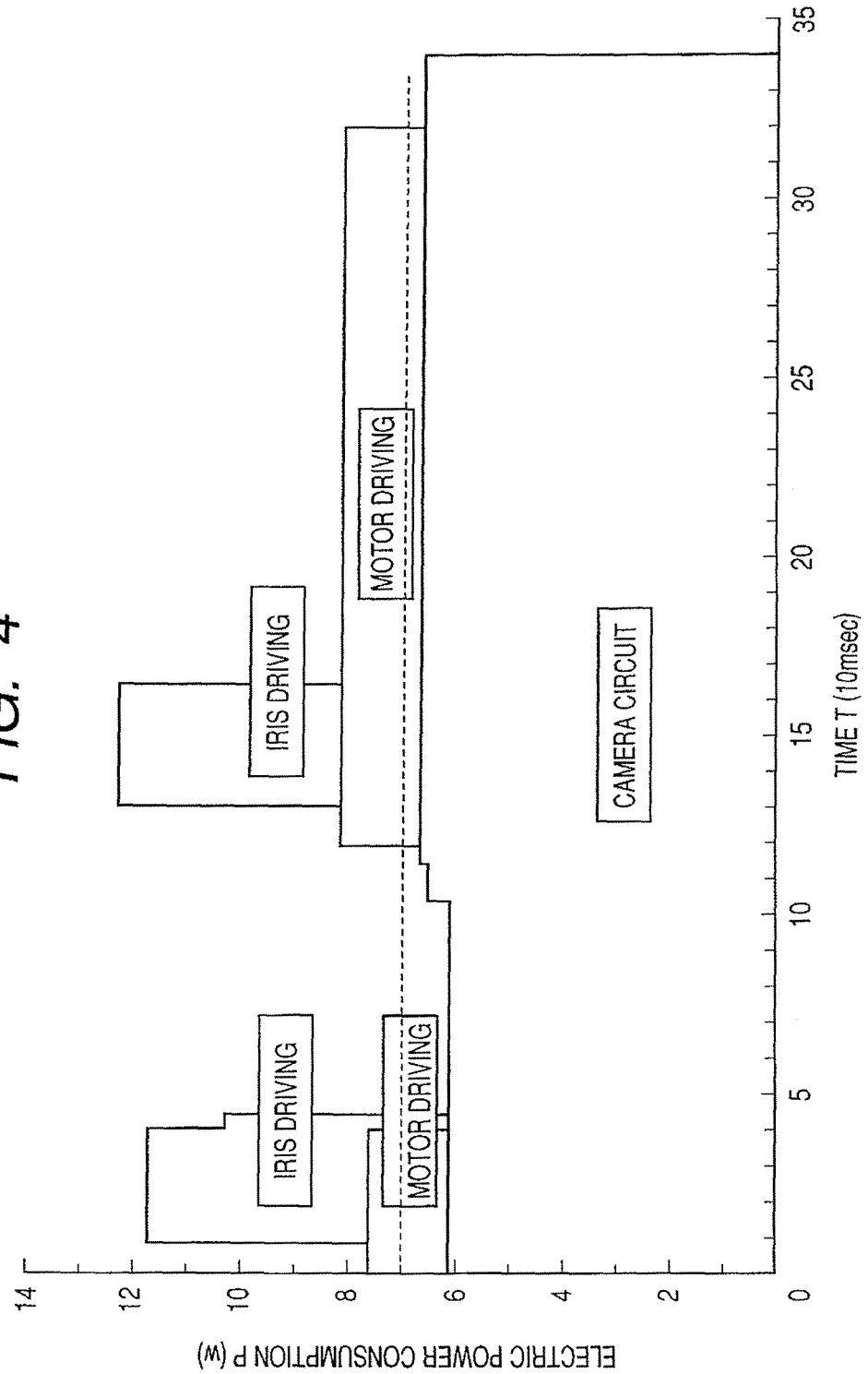
FIG. 4 is a diagram showing an example of a consumption power amount of a drive sequence for a single-lens reflex digital camera.

The predetermined value at Step S103 will be described with reference to FIG. 4. FIG. 4 is a diagram showing an example of a consumption power amount during a drive sequence of the single-lens reflex digital camera. As shown in FIG. 4, while the electric power switch 72 of the single-lens reflex digital camera is turned on, the consumption power of the camera circuit is always about 6.0 to 7.0 W. Depending upon the timing of the camera drive sequence, a power of about 1.5 W is consumed by a motor (not shown) for driving the shutter 12, mirrors 122 and 124, and a power of about 4.0 W is consumed for driving the iris 312.

For example, if purge is effected while a consumption power is relatively large (in FIG. 4, smaller than about 12.0 W) such as driving the motor (not shown) and iris 312 at the same time, a necessary electric power cannot be obtained because of an instantaneous voltage drop, and there is a possibility that driving the single-lens reflex digital camera is influenced. In order to avoid this, it is sufficient if purge is effected while the electric power is consumed only by the camera circuit. Step S103 shown in FIG. 3 judges whether the electric power consumed by the single-lens reflex digital camera is relatively small at the present time. In the example shown in FIG. 4, the predetermined value at Step S103 shown in FIG. 4 is most preferably about 7.0 W indicated by a dotted line in FIG. 4.

If the drive electric power is smaller than the predetermined value (YES at Step S103), the system control circuit 50 outputs a purge start signal to the fuel cell system control circuit 90. The fuel cell system control circuit 90 drives the purge valve 83 to effect purge, and discharges excessive moisture and impurities in the fuel cell stack to the external of the electronic camera main body 100 via the exhaust port 96 (Step S104).

If the drive electric power detection circuit 76 judges that the drive electric power is larger than the predetermined value (NO at Step S103), the system control circuit 50 outputs a purge standby signal to the fuel cell system control circuit 90. The fuel cell system control circuit 90 makes the cell voltage detection circuit 89 measure again the cell voltage of the fuel cell stack 81 to judge whether the cell voltage is lower than a second predetermined value. The second predetermined value is lower than the first predetermined value, and is set to a value near to an inhibition voltage (a voltage at which the single-lens reflex digital camera cannot operate correctly) of the electronic camera main body 100.

If it is judged that the cell voltage is higher than the second predetermined value (NO at Step S105), the fuel cell system control circuit 90 outputs a judgment result to the system control circuit 50 to return to Step S103 whereat the system control circuit 50 makes the drive electric power detection circuit 76 measure again the drive electric power of the electronic camera main body 100. Namely, a loop of Step S103 and S105 is executed if the detection result by the drive electric power detection circuit 76 is larger than the predetermined value and the cell voltage is higher than the second predetermined value.

If it is judged that the cell voltage is lower than the second predetermined value (YES at Step S105), the fuel cell system control circuit 90 outputs a judgment result to the system control circuit 50 to advance to Step S106 whereat the system control circuit 50 controls the electric power source change-over unit 97 to change the electric power source of the electronic camera main body 100 from the fuel cell 80 to the electric power source unit 116.

Next, the system control circuit 50 outputs a purge start signal to the fuel cell system control circuit 90. The fuel cell system control circuit 90 drives the purge valve 83 to effect purge, and discharges excessive moisture and impurities in the fuel cell stack to the external of the electronic camera main body 100 via the exhaust port 96. During purge, in order to maintain the hydrogen pressure in the fuel cell stack 81 at a predetermined value, hydrogen is always exhausted from the hydrogen absorbing alloy 410 in the fuel tank 400 and sent to the fuel cell 80 via the connectors 93 and 412 (Step S107).

After purge, the system control circuit 50 controls the electric power source change-over unit 97 to change the electric power source of the electronic camera main body 100 from the electric power source unit 116 to the fuel cell 80 (Step S108).

A series of control operations of the fuel cell 80 has been described above. The processes shown in FIG. 3 are repeated while the single-lens reflex digital camera uses the fuel cell 80 as its electric power source.

As described above, according to the single-lens reflex digital camera of this embodiment, purge can be effected in the sequence of the single-lens reflex digital camera, if a necessary power is small. It is therefore possible to prevent battery shortage of the single-lens reflex digital camera to be caused by a voltage drop during purge. It is therefore possible to drive the single-lens reflex digital camera by the fuel cell 80, by repeating purge without influencing the operation of the single-lens reflex digital camera.

Further, in the sequence of the single-lens reflex digital camera, the electric power source unit 116 is temporality used in place of the fuel cell 80 and purge is completed during this period, if a necessary electric power is large and if purge is required immediately in the state that driving the single-lens reflex digital camera is influenced if purge is effected. Accordingly, the fuel cell 80 can be purged without influencing the operation of the single-lens reflex digital camera, and driving the single-lens reflex digital camera can continue by using the fuel cell 80 as the main electric power source.

Next, with reference to the accompanying drawings, description will be made on examples of the control operation for the fuel cell 80 in various use states (first to six use states) of the single-lens reflex digital camera of this embodiment.

First Use State

Figure 5:
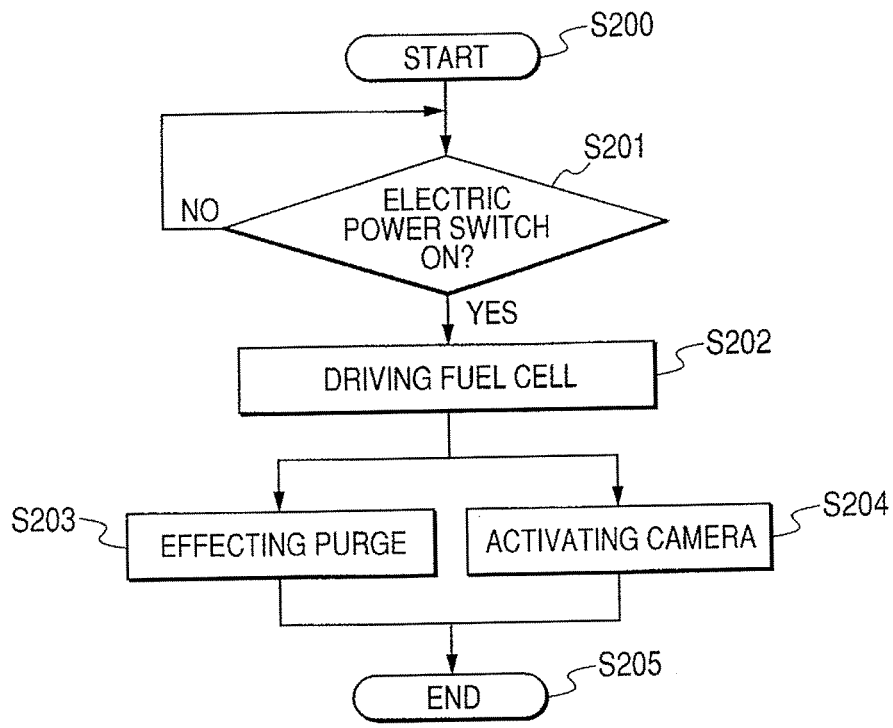
FIG. 5 is a flow chart illustrating an example of the control operation for the fuel cell 80 of a single-lens reflex digital camera in a first use state.

The electric power switch 72 of the single-lens reflex digital camera is turned on in the first use state that the fuel gas of the fuel electrode in the fuel cell 80 was reduced because the single-lens reflex digital camera was maintained unused for a long time and the fuel cell 80 was not driven. FIG. 5 is a flow chart illustrating an example of the control operation for the fuel cell 80 of the single-lens reflex digital camera in the first use state.

As shown in FIG. 5, first the system control circuit 50 judges whether the electric power switch 72 of the electronic camera main body 100 is turned on (Step S201). If it is judged that the electric power switch 72 is off (NO at Step S201), the system control circuit 50 repeats the judgment process at Step S201 until the electric power switch 72 is turned on.

In the state that the electric power switch 72 is OFF, an electric power is not supplied to the single-lens reflex digital camera, so that the judgment process is not performed. When the electric power switch 72 changes from the OFF state to an ON state, an electric power is supplied to the system control circuit 50 to judge the state of the electric power switch. However, depending upon the control of the electric power source, a power saving mode such as a suspend (sleeve) state is executed. In this case, the state of the electric power switch 72 is judged as the OFF state. In this power saving mode, the judgment process (Step S201) can be executed at a predetermined time interval. In this power saving mode, the ON state occurs upon a predetermined operation, e.g., in response to a photographing instruction. At this timing, the ON state of the electric power switch 72 may be judged.

If it is judged that the electric power switch 72 is turned on (YES at Step S201), the system control circuit 50 starts driving the fuel cell 80 (Step S202).

As the fuel cell 80 starts being driven at Step S202, the system control circuit 50 outputs a purge start signal to the fuel cell system control circuit 90. The fuel cell system control circuit 90 drives the purge valve 83 to effect purge, and discharges excessive moisture and impurities in the fuel cell stack 81 to the external of the electronic camera main body 100 via the exhaust port 96.

During purge, in order to maintain the hydrogen pressure in the fuel cell stack 81 at a predetermined value, hydrogen is always exhausted from the hydrogen absorbing alloy 410 in the fuel tank 400 and sent to the fuel cell 80 via the connectors 93 and 412 (Step S203). At the same time, the system control circuit 50 starts an electric power supply from the fuel cell 80 to the electronic camera main body 100 to activate the camera (Step S204).

Whether the system control circuit 50 outputs the purge start signal to the fuel cell system control circuit 90 at Step S202, may be determined in the following manner. As described with Steps S101 and S102 in FIG. 3, the cell voltage detection circuit 89 measures the cell voltage of the fuel cell stack 81, and in accordance with this measurement, the fuel cell system control circuit 90 notifies the system control circuit of that purge is necessary.

As described above, according to the single-lens reflex digital camera of this embodiment, even if the fuel gas of the fuel electrode in the fuel cell 80 is reduced because the single-lens reflex digital camera is maintained unused for a long time, purge is effected when the electric power switch 72 of the single-lens reflex digital camera is turned on. It is therefore possible to fill the fuel electrode of the fuel cell 80 with fuel gas and improve a rise of the output voltage. If purge is effected only when necessary, wasteful purge can be avoided in the case in which the electric power switch is turned on and off in a short time.

Second Use State

Figure 6:
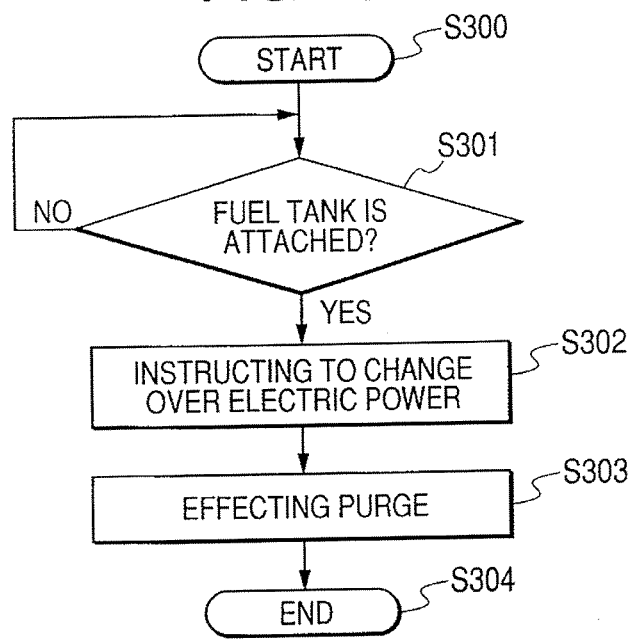
FIG. 6 is a flow chart illustrating an example of the control operation for the fuel cell 80 of the single-lens reflex digital camera in a second use state.

The fuel tank 400 (fuel gas supply means) of the single-lens reflex digital camera is loaded in the second use state that the fuel gas of the fuel electrode of the fuel cell 80 was reduced because the fuel tank 400 was not loaded. FIG. 6 is a flow chart illustrating an example of the control operation for the fuel cell 80 of the single-lens reflex digital camera in the second use state.

As shown in FIG. 6, even if the fuel tank 400 is not loaded in the electronic camera main body 100, the system control circuit operates by the electric power supplied from the electric power source unit 116. The system control circuit 50 controls the fuel tank attach and detach detection unit 74 to judge whether the fuel tank 400 is attached to the connector 93 (Step S301).

If the fuel tank 400 is not mounted on the connector 93 (NO at Step S301), the fuel tank attach and detach detection unit 74 repeats this judgment until the fuel tank, 400 is mounted on the connector 93.

If it is judged that the fuel tank 400 is mounted on the connector 93 (YES at Step S301), the fuel tank attach and detach detection unit 74 outputs a signal to the system control circuit 50, the signal being denotative of that the fuel tank 400 is loaded. The system control circuit 50 instructs the electric power source change-over unit 97 to change the electric power source from the electric power source unit 116 to the fuel cell 80 (Step S302).

Next, the system control circuit 50 outputs a purge start signal to the fuel cell system control circuit 90. The fuel cell system control circuit 90 drives the purge valve 83 to effect purge, and, discharges excessive moisture and impurities in the fuel cell stack 81 to the external of the electronic camera main body 100 via the exhaust port 96. During purge, in order to maintain the hydrogen pressure in the fuel cell stack 81 at a predetermined value, hydrogen is always exhausted from the hydrogen absorbing alloy 410 in the fuel tank 400 and sent to the fuel cell 80 via the connectors 93 and 412 (Step S303).

Although the change-over of the electric power source is executed at Step S302 shown in FIG. 6, the change-over may be executed after purge is effected (Step S303) and an output of the fuel cell 80 is stabilized. Whether the system control circuit 50 outputs the purge start signal to the fuel cell system control circuit 90 at Step S303, may be determined based on the following fact. As described with Steps S101 and S102 in FIG. 3, the cell voltage detection circuit 89 measures the cell voltage of the fuel cell stack 81, and in accordance with this measurement, the fuel cell system control circuit 90 notifies the system-control circuit of that purge is necessary, or not.

As described above, according to the single-lens reflex digital camera of this embodiment, even if the fuel gas of the fuel electrode in the fuel cell 80 is reduced because the fuel tank 400 is not loaded in the single-lens reflex digital camera, purge is effected when the fuel tank 400 is loaded. It is therefore possible to fill the fuel electrode of the fuel cell 80 with fuel gas and improve a rise of the output voltage. If purge is effected only when necessary, wasteful purge can be avoided in the case in which the fuel tank 400 is exchanged instantly.

Third Use State

Figure 7:
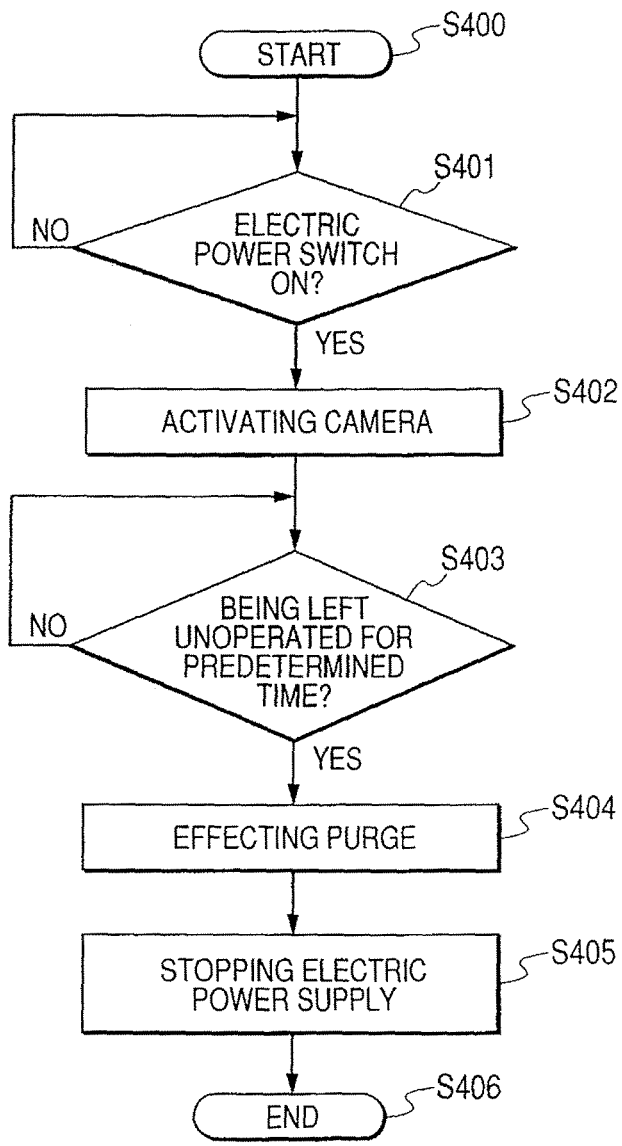
FIG. 7 is a flow chart illustrating an example of the control operation for the fuel cell 80 of the single-lens reflex digital camera in a third use state.

An auto power-off is effected in the third use state that the fuel gas of the fuel electrode in the fuel cell 80 was reduced because the single-lens reflex digital camera was maintained unused for a long time and the fuel cell 80 was not driven. FIG. 7 is a flow chart illustrating an example of the control operation for the fuel cell 80 of the single-lens reflex digital camera in the third use state.

As shown in FIG. 7, first the system control circuit 50 judges whether the electric power switch 72 of the electronic camera main body 100 is turned on (Step S401). If the electric power switch 72 is turned on (YES at Step S401), the system control circuit 50 starts driving the fuel cell 80 to activate the single-lens reflex digital camera (Step S402). If the electric power switch 72 is in an OFF state (NO at Step S401), the system control circuit 50 repeats the judgment process until the electric power switch 72 is turned on.

In the state that the electric power switch 72 is OFF, an electric power is not supplied to the single-lens reflex digital camera, so that the judgment process is not performed. When the electric power switch 72 changes from the OFF state to an ON state, an electric power is supplied to the system control circuit 50 to judge the state of the electric power switch. However, depending upon the control of the electric power source, a power saving mode such as a suspend (sleeve) state is executed. In this case, the state of the electric power switch 72 is judged as the OFF state. In this power saving mode, the judgment process (Step S401) can be executed at a predetermined time interval. In this power saving mode, the ON state occurs upon a predetermined operation, e.g., in response to a photographing instruction. At this timing, the ON state of the electric power switch 72 may be judged.

Next, after the single-lens reflex digital camera is activated, the system control circuit 50 controls the timing generator circuit 18 to measure the time from when various switches of the operation unit 70 and the like are lastly operated to the present time, to thereby judge whether the unoperated state (hereinafter called a camera unoperated state) of the single-lens reflex digital camera reaches a predetermined time (Step S403).

If it is judged at Step S403 that the camera unoperated time does not reach the predetermined time (NO at Step S403), the system control circuit 50 repetitively measures the time from when various switches of the operation unit 70 and the like are lastly operated to the present time, until it is judged that the camera unoperated state is longer than the predetermined time. The single-lens reflex digital camera of this embodiment has an auto power-off function of stopping an electric power supply to the electronic camera main body 100 when the camera unoperated state continues longer than the predetermined time.

If it is judged at Step S403 that the camera unoperated state reaches the predetermined time (YES at Step S403), the system control circuit 50 outputs a purge start signal to the fuel cell system control circuit 90. The fuel cell system control circuit 90 drives the purge valve 83 to effect purge, and discharges excessive moisture and impurities in the fuel cell stack 81 to the external of the electronic camera main body 100 via the exhaust port 96. During purge, in order to maintain the hydrogen pressure in the fuel cell stack 81 at a predetermined value, hydrogen is always exhausted from the hydrogen absorbing alloy 410 in the fuel tank 400 and sent to the fuel cell 80 via the connectors 93 and 412 (Step S404). After purge, the system control circuit 50 stops driving the fuel cell 80 and stops an electric power supply to the electronic camera main body 100.

If the single-lens reflex digital camera has the power saving mode, the power saving mode state may occur after the lapse of the predetermined time. In this case, purge is effected in the power saving mode. Whether the system control circuit 50 outputs the purge start signal to the fuel cell system control circuit 90 in YES at Step S403, may be determined based on the following fact. As described with Steps S101 and S102 in FIG. 3, the cell voltage detection circuit 89 measures the cell voltage of the fuel cell stack 81, and in accordance with this measurement, the fuel cell system control circuit 90 notifies the system control circuit of that purge is necessary, or not.

As described above, according to the single-lens reflex digital camera of this embodiment, even if the fuel gas of the fuel electrode in the fuel cell 80 is reduced because the single-lens reflex digital camera is maintained unused for a long time, purge is effected before auto power-off. It is therefore possible to fill the fuel electrode with fuel gas. It is possible to improve a rise of the output voltage of the fuel cell 80 when the electronic camera main body 100 is activated next.

Fourth Use State

Figure 8:
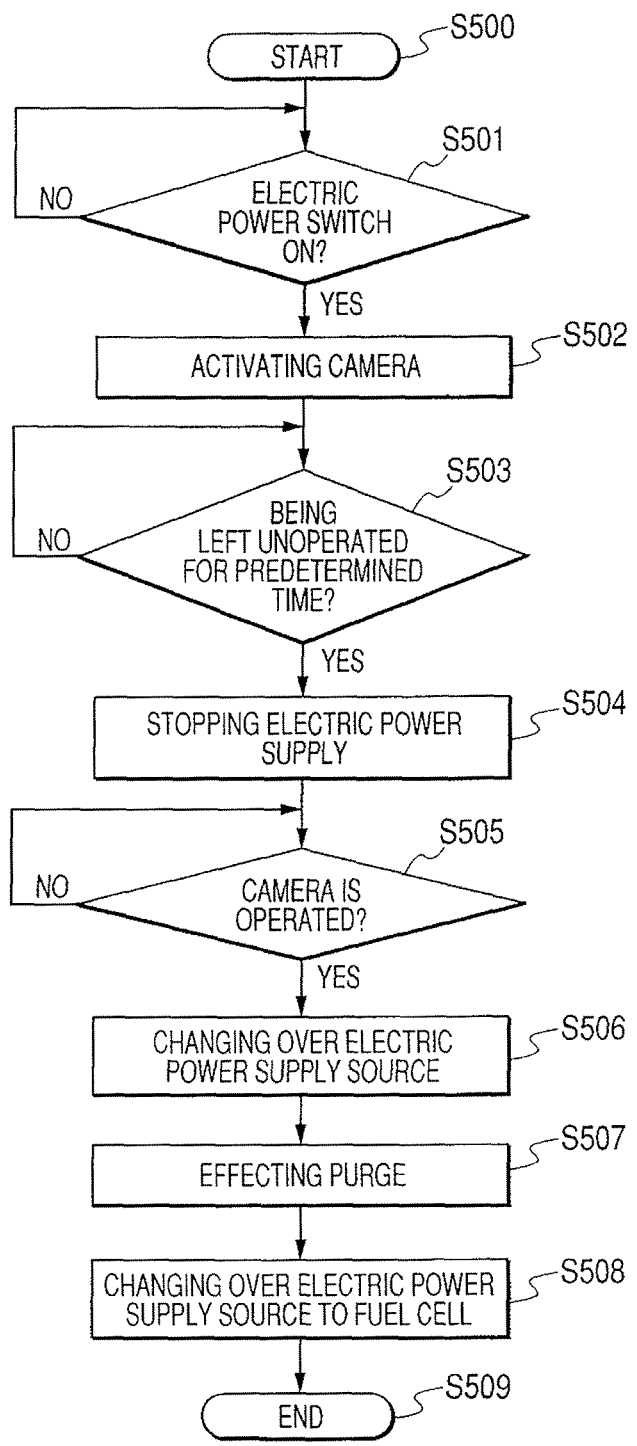
FIG. 8 is a flow chart illustrating an example of the control operation for the fuel cell 80 of the single-lens reflex digital camera in a fourth use state.

The single-lens reflex digital camera is activated again in the forth use state that the fuel gas of the fuel electrode in the fuel cell 80 was reduced because the single-lens reflex digital camera was maintained unused for a long time and the fuel cell 80 was not driven, and in the auto power-off state. FIG. 8 is a flow chart illustrating an example of the control operation for the fuel cell 80 of the single-lens reflex digital camera in the fourth use state.

As shown in FIG. 8, first the system control circuit 50 judges whether the electric power switch 72 is turned on (Step S501). If it is judged that the electric power switch 72 is turned on (YES at Step S501), the system control circuit 50 starts driving the fuel cell 80 to activate the single-lens reflex digital camera (Step S502). If it is judged that the electric power switch 72 is in an OFF state (NO at Step S501), the system control circuit 50 repeats the judgment process until the electric power switch 72 is turned on. In the state that the electric power switch 72 is OFF, an electric power is not supplied to the single-lens reflex digital camera, so that the judgment process is not performed. When the electric power switch 72 changes from the OFF state to an ON state, an electric power is supplied to the system control circuit 50 to judge the state of the electric power switch.

Next, after the single-lens reflex digital camera is activated, the system control circuit 50 controls the timing generator circuit 18 to measure the time from when various switches of the operation unit 70 and the like are lastly operated to the present time, to thereby judge whether the camera unoperated state reaches a predetermined time (Step S503).

If it is judged at Step S503 that the camera unoperated time does not reach the predetermined time (NO at Step S503), the system control circuit 50 repetitively measures the time from when various switches of the operation unit 70 and the like are lastly operated to the present time, until it is judged that the camera unoperated state is longer than the predetermined time.

If it is judged at Step S503 that the camera unoperated state reaches the predetermined time (YES at Step S503), the system control circuit 50 stops a main electric power supply for driving the electronic camera main body 100 (Step S504). In this case, even if the main electric power supply for driving the electronic camera main body 100 is stopped, an electric power supply to the system control circuit 50 continues, for example, from the electric power supply unit 116. Next, the system control circuit 50 judges whether various operation switches of the operation unit 70 and the like are operated (whether the camera unoperated state terminates) (Step S505).

If it is judged that the camera unoperated state continues (NO at Step S505), the judgment process is repeated until various operation switches of the operation unit 70 and the like are operated again. If it is judged at Step S505 that the operation of various operation switches of the operation unit 70 and the like is detected (YES at Step S505), the system control circuit 50 controls the electric power source control circuit 98 to stop driving the fuel cell 80, and controls the electric power source change-over unit 97 to change the electric power source of the electronic camera main body 100 from the fuel cell 80 to the power source unit 116 and start a power supply to the electronic camera main body 100 (Step S506).

Next, the system control circuit 50 outputs a purge start signal to the fuel cell system control circuit 90. The fuel cell system control circuit 90 drives the purge valve 83 to effect purge, and discharges excessive moisture and impurities in the fuel cell stack 81 to the external of the electronic camera main body 100 via the exhaust port 96. During purge, in order to maintain the hydrogen pressure in the fuel cell stack 81 at a predetermined value, hydrogen is always exhausted from the hydrogen absorbing alloy 410 in the fuel tank 400 and sent to the fuel cell 80 via the connectors 93 and 412 (Step S507). After purge, the system control circuit 50 controls the electric power source change-over unit 97 to change the electric power source of the electronic camera main body 100 from the electric power source unit 116 to the fuel cell 80 (Step S508).

In the sequence from Step S506 to S507, whether the system control circuit 50 outputs the purge start signal to the fuel cell system control circuit 90, may be determined based on the following fact. As described with Steps S101 and S102 in FIG. 3, the cell voltage detection circuit 89 measures the cell voltage of the fuel cell stack 81, and in accordance with this measurement, the fuel cell system control circuit 90 notifies the system control circuit of that purge is necessary, or not.

As described above, according to the single-lens reflex digital camera of this embodiment, purge of the fuel cell 80 can be effected when the single-lens reflex digital camera is activated again in the state that the fuel gas of the fuel electrode in the fuel cell 80 was reduced because the single-lens reflex digital camera was maintained unused for a long time and the fuel cell 80 was not driven, and in the auto power-off state. Since the fuel electrode of the fuel cell 80 is filled with fuel gas, it is possible to improve a rise of the output voltage of the fuel cell 80 when the electronic camera main body is re-activated. Since the electric power source unit 116 is used in place of the fuel cell 80 during purge, driving the electronic camera main body can be continued without influencing the operation thereof even if the output voltage of the fuel cell 80 lowers during purge.

Fifth Use State

Figure 9:
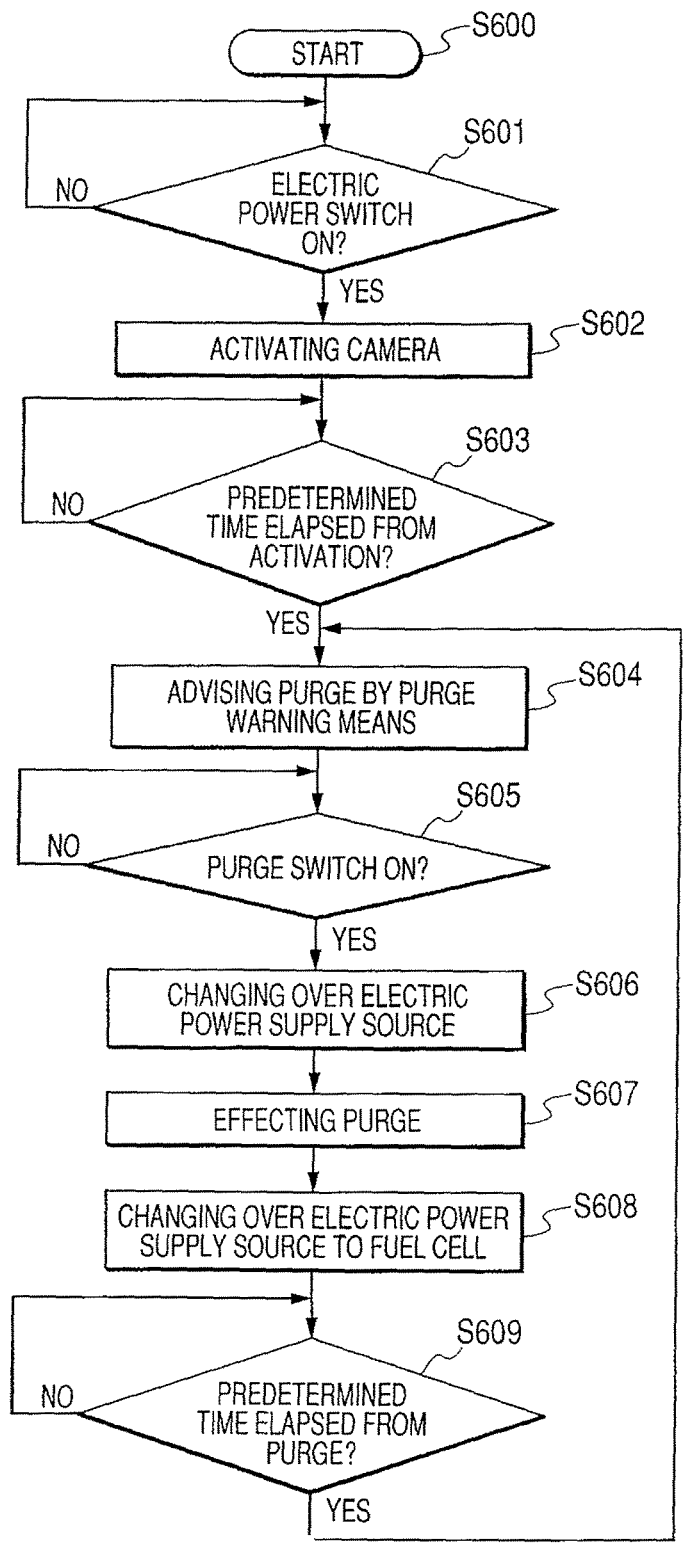
FIG. 9 is a flow chart illustrating an example of the control operation for the fuel cell 80 of the single-lens reflex digital camera in a fifth use state.

Purge is effected in the fifth use state when a user of the single-lens reflex digital camera turns on the purge operation switch 78. FIG. 9 is a flow chart illustrating an example of the control operation for the fuel cell 80 of the single-lens reflex digital camera in the fifth use state.

As shown in FIG. 9, first the system control circuit 50 judges whether the electric power switch 72 is turned on (Step S601). If it is judged that the electric power switch 72 is turned on (YES at Step S601), the system control circuit 50 starts driving the fuel cell 80 to activate the single-lens reflex digital camera (Step S602). If it is judged that the electric power switch 72 is in an OFF state (NO at Step S601), the system control circuit 50 repeats the judgment process until the electric power switch 72 is turned on. In the state that the electric power switch 72 is OFF, an electric power is not supplied to the single-lens reflex digital camera, so that the judgment process is not performed. When the electric power switch 72 changes from the OFF state to an ON state, an electric power is supplied to the system control circuit 50 to judge the state of the electric power switch.

After the single-lens reflex digital camera is activated at Step S602, the system control circuit 50 controls the timing generator circuit 18 to measure the time from when the single-lens reflex digital camera is activated to the present time, to thereby judge whether a predetermined time reaches (Step S603). If it is judged at Step S603 that the time from when the single-lens reflex digital camera is activated to the present time does not reach the predetermined time (NO at Step S603), the system control circuit 50 repetitively measures the time from when the single-lens reflex digital camera is activated to the present time, until the time exceeds the predetermined time.

If it is judged at Step S603 that the time from when the single-lens reflex digital camera is activated to the present time, reaches the predetermined time (YES at Step S603), the system control circuit 50 controls the purge alarm unit 55 to issue an alarm to a user of the single-lens reflex digital camera and make the user turn on the purge operation switch 78.

Next, the system control circuit 50 judges whether the user turns on the purge operation switch 78 (Step S605). If it is judged that the purge operation switch 78 is not turned on (NO at Step S605), the system control circuit 50 instructs the purge alarm unit 55 to continuously issue the alarm, and repetitively judges whether the purge operation switch 78 is turned on.

If it is judged at Step S605 that the user turns on the purge operation switch 78 in response to the alarm from the purge alarm unit 55 (YES at Step S605), the system control circuit 50 controls the electric power source change-over unit 97 to change the electric power source of the electronic camera main body 100 from the fuel cell 80 to the power source unit 116.

Next, the system control circuit 50 outputs a purge start signal to the fuel cell system control circuit 90. The fuel cell system control circuit 90 drives the purge valve 83 to effect purge, and discharges excessive moisture and impurities in the fuel cell stack 81 to the external of the electronic camera main body 100 via the exhaust port 96. During purge, in order to maintain the hydrogen pressure in the fuel cell stack 81 at a predetermined value, hydrogen is always exhausted from the hydrogen absorbing alloy 410 in the fuel tank 400 and sent to the fuel cell 80 via the connectors 93 and 412 (Step S607).

After purge, the system control circuit 50 controls the electric power source change-over unit 97 to change the electric power source of the electronic camera main body 100 from the electric power source unit 116 to the fuel cell 80 (Step S608).

Next, the system control circuit 50 controls the timing generator circuit 18 to measure the time from a purge completion to the present time and judge whether the time reaches a predetermined time (Step S609).

If it is judged at Step S609 that the time from the purge completion to the present time does not reach the predetermined time (NO at Step S609), the system control circuit 50 repetitively measures the time from the purge completion to the present time, until the time excesses the predetermined time. If it is judged at Step S609 that the time from the purge completion to the present time reaches the predetermined time (YES at Step S609), the flow returns to Step S604.

When an alarm is issued at Step S604, whether the alarm is to be issued may be judged in the following manner. The cell voltage detection circuit 89 measures the cell voltage of the fuel cell stack 81, and in accordance with the measurement result, the fuel cell system control circuit 90 notifies the system control circuit of a necessity of purge. Namely, when it is judged that purge is not necessary, the alarm may not be issued.

As described above, according to the single-lens reflex digital camera of this embodiment, purge is effected when a user of the single-lens reflex digital camera turns on the purge operation switch 78. It is therefore possible to continuously use the single-lens reflex digital camera, without being bothered with a voltage drop during purge or impact by purge (depending upon the position of a hand or a face of the user, there is a possibility that the user receives impact such as being surprised by discharge from the exhaust port 96 during purge).

A timing when purge is necessary is judged from a continuous drive time of the single-lens reflex digital camera. It is therefore possible to notify a user of the single-lens reflex digital camera of a timing when the purge operation switch 78 is depressed. Since the electric power source unit is used in place of the fuel cell 80 during purge, shortage of the fuel cell of the single-lens reflex digital camera to be caused by a voltage drop during purge can be prevented, and driving the electronic camera main body can be continued without influencing the operation thereof.

Another Operation in Fifth Use State

Description will be made on an example of the operation different from the operation shown in FIG. 9 in the fifth use state.

Figure 10:
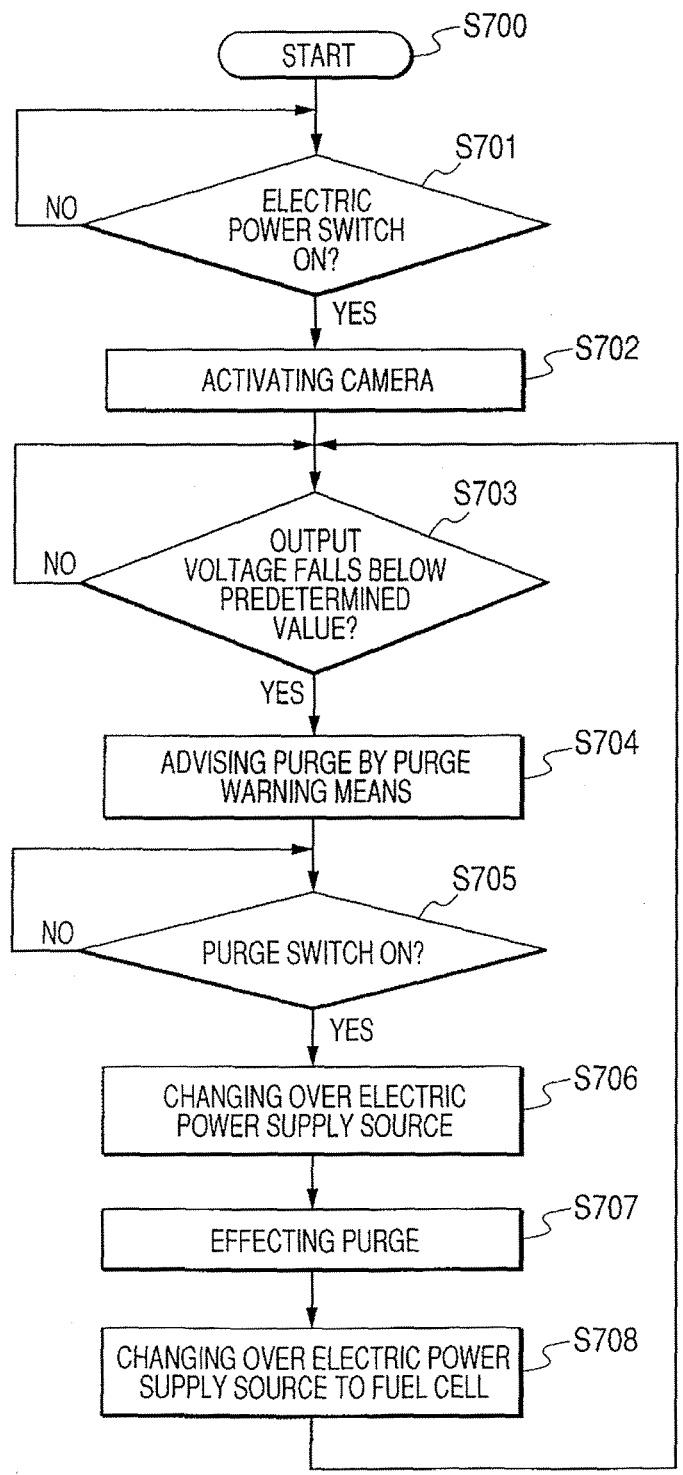
FIG. 10 is a flow chart illustrating an example of another control operation for the fuel cell 80 of the single-lens reflex digital camera in the fifth use state.
Figure 11:
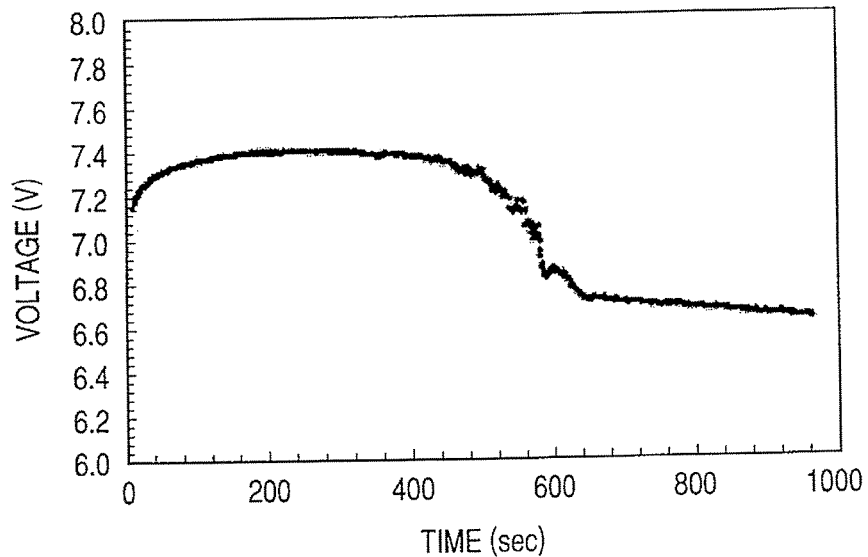
FIG. 11 is a diagram showing a change in an output voltage of a fuel cell in use.
Figure 12:
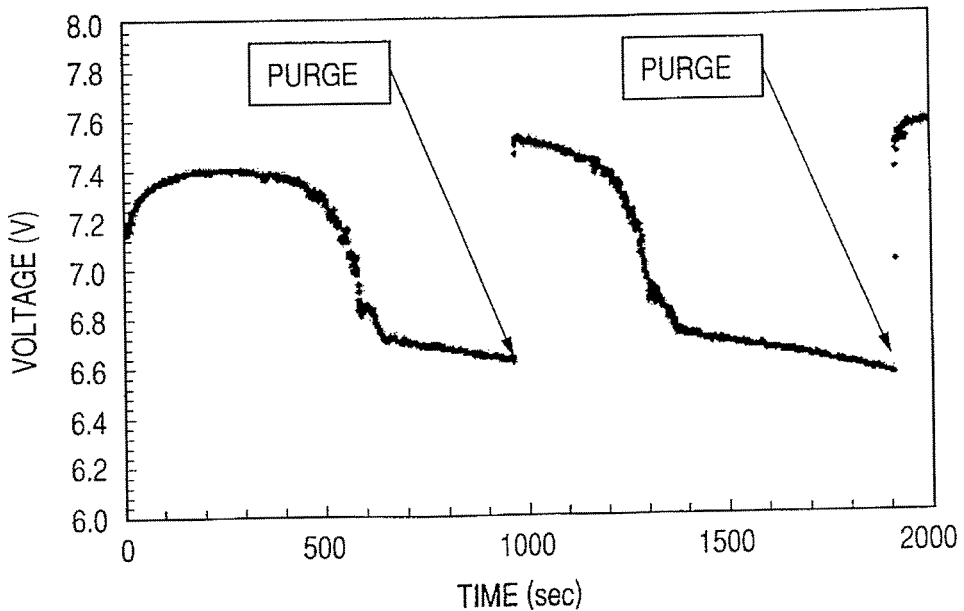
FIG. 12 is a diagram showing a change in an output voltage of a fuel cell in use under purge.

FIG. 10 is a flow chart illustrating another example of the control operation for the fuel cell 80 of the single-lens reflex digital camera in the fifth use state. The processes at Steps S701 and S702 and the processes at Steps S704 to S707 shown in FIG. 10 are similar to the processes at Steps S601 and S602 and the processes at Steps S604 to S607 shown in FIG. 9, and the description thereof is omitted.

After the single-lens reflex digital camera is activated at Step S702, the fuel cell system control circuit 90 makes the cell voltage detection circuit 89 measure the cell voltage of the fuel cell stack 81 to thereby judge whether the cell voltage is lower than a predetermined value (whether purge is necessary) (Step S703).

If it is judged that the cell voltage is higher than the predetermined value (NO at Step S703), the cell voltage detection circuit 89 measures again the cell voltage of the fuel cell stack 81, and the process at Step S703 is repeated until the cell voltage becomes lower than the predetermined value. If it is judged that the cell voltage is lower than the predetermined value (YES at Step S703), the fuel cell system control circuit 90 notifies the system control circuit 50 of a necessity of purge. The system control circuit 50 controls the purge alarm unit 55 to issue an alarm to a user to make the user turn on the purge operation switch 78 (Step S704).

After purge is completed at Step S707, the system control circuit 50 controls the electric power source change-over circuit 97 to change the electric power source of the electronic camera main body 100 from the electric power source unit 116 to the fuel cell 80 (Step S708) to thereafter return to Step S703.

As described above, according to the single-lens reflex digital camera of this embodiment, purge is effected when a user of the single-lens reflex digital camera turns on the purge operation switch 78, and the single-lens reflex digital camera can be continuously used without being bothered with a voltage drop during purge or impact to be caused by purge.

Further, a timing when a purge operation switch is depressed can be notified to a user of the single-lens reflex digital camera, by judging from the output voltage of the fuel cell 80 the timing when purge becomes necessary and issuing an alarm when purge becomes necessary. Furthermore, since the electric power source unit 116 is used in place of the fuel cell 80 during purge, shortage of the fuel cell of the single-lens reflex digital camera to be caused by a voltage drop during purge can be prevented, and driving the electronic camera main body by the fuel cell 80 can be continued without influencing the operation thereof.

In the above-described embodiments, the fuel cell 80 is loaded in the electronic camera main body 100 and the fuel tank 400 is detachably loaded in the electronic camera main body 100. This is an example of preferred embodiments of the present invention, and the present invention is not limited thereto. For example, the fuel cell 80 together with the fuel tank 400 may be mounted in the external of the electronic camera main body 100, and connected to the electronic camera main body 100 via the connectors 93 and 412. In this case, electric power source lines for supplying an electric power source voltage are provided, and signal lines for transferring signals between the system control circuit 50 and fuel cell system control circuit 90 are provided.

As described so far, according to the single-lens reflex digital camera of the embodiments, purge is effected in accordance with the camera state. It is therefore possible to effect purge of the fuel cell 80 at the timing not influencing the camera operation, and driving the fuel cell 80 can be continued. According to the single-lens reflex digital camera of the embodiments, since purge is effected in the camera operation sequence at the timing when a consumption power is small, battery shortage or the like of the single-lens reflex digital camera to be caused by a voltage drop during purge can be presented.

Further, according to the single-lens reflex digital camera of the embodiments, even in the state that the fuel gas of the fuel electrode in the fuel cell 80 was reduced because the single-lens reflex digital camera was maintained unused for a long time and the fuel cell 80 was not driven, since purge is effected when the electric power switch 72 of the single-lens reflex digital camera is turned on, and then the fuel electrode of the fuel cell 80 is filled with fuel gas, it is possible to improve a rise of the output voltage.

The embodiments of the present invention have been described in detail with reference to the accompanying drawings. Specific structures are not limited to the embodiments, but other designs and the like are possible in the range not departing from the gist of the present invention.

According to the embodiments of the present invention, a single-lens reflex digital camera is used as an example of the electronic apparatus of the present invention. The electronic apparatus of the present invention is not limited only to the single-lens reflex digital camera, but other compact electronic apparatus may also be used, such as a compact camera, a PDA, a mobile phone and a note type personal computer.

Next, description will be made on a portable electronic apparatus adopting the present invention, by using a cellar phone as an example.

Figure 13B:
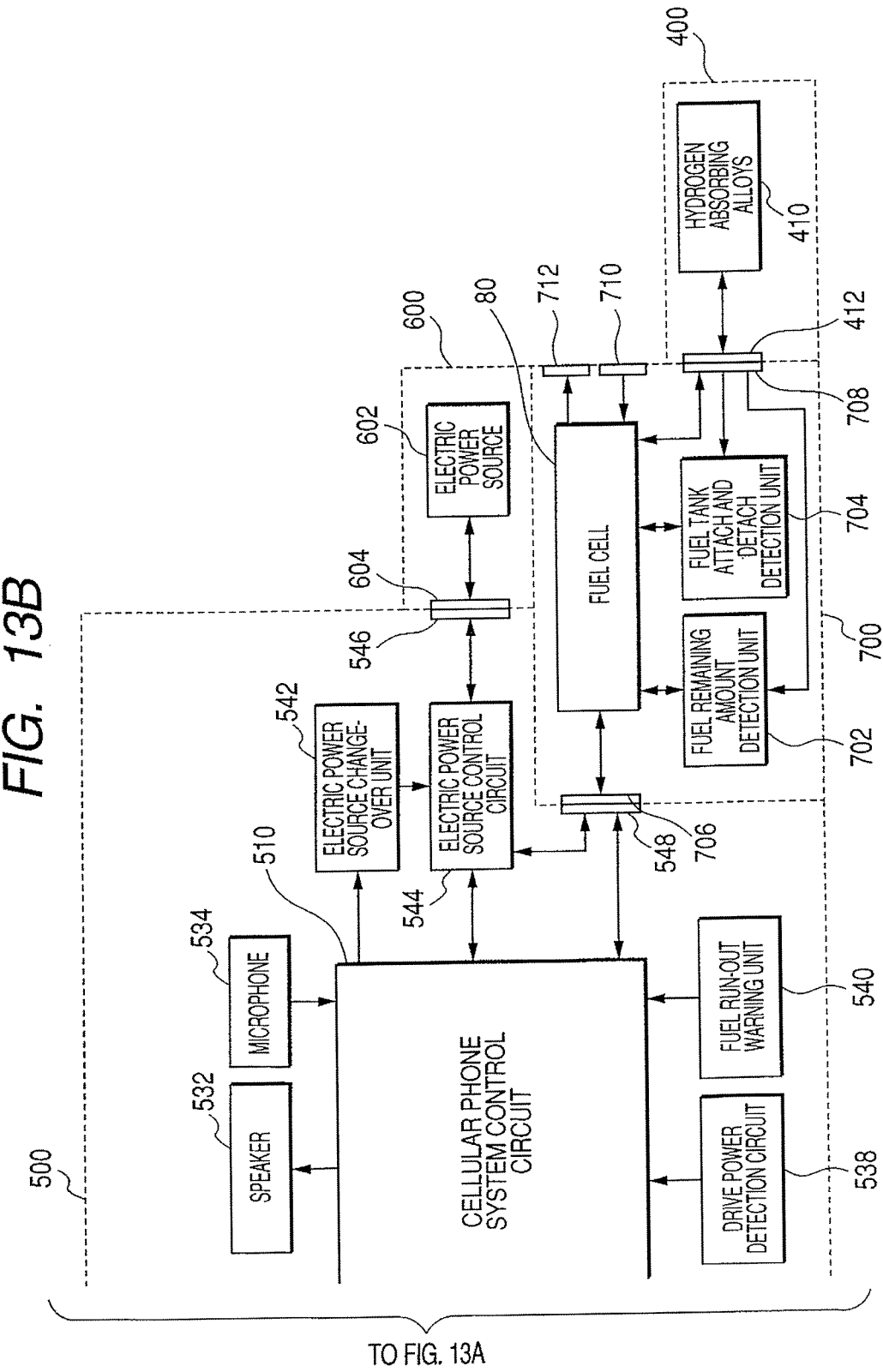
FIG. 13 is comprised of FIGS. 13A and 13B are block diagrams showing the internal structure of a cellar phone according to an embodiment of the present invention.

FIGS. 13A and 13B are block diagrams showing the internal structure of a cellar phone according to an embodiment of the present invention. A fuel cell 80 and a fuel tank 400 are represented by identical reference numerals to those of the corresponding components in FIGS. 1A and 1B for the convenience of description.

As shown in FIGS. 13A and 13B, the cellar phone of the embodiment is constituted of a cellar phone main body 500, a fuel tank (hydrogen supply source) 400, an electric power source unit 600 and a fuel cell unit 700. The fuel tank 400 and electric power source unit 600 are detachably mounted on the cellar phone main body 500.

A cellar phone system control circuit 510 has a central processing unit (CPU), an internal random access memory (internal RAM), a read-only memory (ROM) and the like (each of them is not shown). The CPU controls the entirety of the cellar phone main body 500 by using a predetermined area of the internal RAM as a working area, in accordance with various control programs stored in ROM.

A storage unit 512 is a volatile memory RAM, a magnetic/optical recording medium and its reader unit, or a non-volatile memory. For example, the storage unit stores programs for the system and operation of the cellar phone main body 500, including an operating system (OS) and various operation programs, and various data such as moving images and audio data.

A display driver 520 converts an image signal input from the cellar phone system control circuit 510 into an image output signal which is output to a main display unit 522 or sub-display unit 524 to display an image.

An operation unit 530 is made of various buttons, touch panels and the like.

A speaker 532 outputs sounds and voices in accordance with audio output data input from the cellar phone system control circuit 510.

A microphone 534 converts externally-input sounds and voices into an audio analog signal and outputs the signal to the cellar phone system control circuit 510.

An electric power switch 536 can selectively set each of electric power on/off modes of the cellar phone main body 500.

A drive power detection circuit 538 detects a drive electric power of the cellar phone main body 500.

A fuel run-out warning unit 540 warns a user about the fact that hydrogen is required to be supplied immediately to hydrogen absorbing alloys 410 if the hydrogen remaining amount in the hydrogen absorbing alloys 410 of the fuel tank 400 becomes lower than a predetermined amount necessary for driving the cellar phone, or the fact that a fuel tank 400 having hydrogen absorbing alloys 410 absorbing hydrogen sufficient for driving the cellar phone is required to be attached to the fuel cell unit 700.

An electric power source change-over unit 542 switches the electric power source of the cellar phone main body 500 from the fuel cell unit 700 to the electric power source unit 600, or from the electric power source unit 600 to the fuel cell unit 700, under the control of the cellar phone system control circuit 510.

An electric power source control circuit 544 is constituted of a cell detection circuit, a DC-DC converter, a switch circuit for switching a block to be powered. The electric power source control circuit detects the type of a cell and a cell remaining amount, and controls the DC/DC converter in accordance with the detection results or an instruction from the cellar phone system control circuit 510 to thereby supply a necessary voltage to each component for a necessary period.

Connectors 546 and 604 interconnect the cellar phone main body 500 and electric power source unit 600.

Connectors 548 and 706 interconnect the cellar phone main body 500 and fuel cell unit 700.

An image entered from a photographing lens 554 and focused on an image pickup element 552 is converted into an image signal which is output to the cellar phone system control circuit 510, in accordance with an instruction from the cellar phone system control circuit 510.

A communication antenna 562 transmits and receives a reception signal and a reception signal which are subjected to an RF process by a wireless transmission unit 564.

A transmission/reception change-over switch 566 is connected to a reception or transmission side by the cellar phone system control circuit 510.

Reference numeral 568 denotes a receiving unit, reference numeral 570 denotes a received data processing unit, reference numeral 572 denotes a transmission unit, and reference numeral 574 denotes a transmission-data processing unit.

In a reception mode, under the control of the cellar phone system control circuit 510, the change-over switch 566 is first connected to the side of the receiving unit 568. A signal received at the communication antenna 562 is subjected to the RF process at the wireless transmission unit 564, thereafter demodulated at the receiving unit 568, and then decoded at the received data processing unit 570.

If the signal is audio data, it is output from the speaker 532, whereas if the signal is text data or image data, it is displayed on the main display unit 522 or sub-display unit 524 via the display driver 520.

In a transmission mode, under the control of the cellar phone system control circuit 510, the change-over switch 566 is connected to the side of the transmission unit 572. Data input from the operation unit 530, microphone 534 or image pickup element 552 is input to the transmission data processing unit 574, encoded at the transmission data processing unit 574, modulated at the transmission unit 572, subjected to the RF process at the wireless transmission unit 564, and then transmitted from the communication antenna 562.

Next, the electric power source unit 600 will be described. The electric power source unit 600 is constituted of an electric power source 602 and a connector 604. The electric power source 602 is constituted of a primary battery such as an alkali battery and a lithium battery, a secondary battery such as a NiCd battery, an NiMH battery and a Li battery, and an AC adapter. The connector 604 interconnects the electric power source unit 600 and cellar phone main body 500.

Next, the fuel cell unit 700 will be described. The fuel cell unit 700 is constituted of a fuel cell unit 80, a fuel remaining amount detection unit 702, a fuel tank attach and detach detection unit 704, connectors 706 and 708, a gas inlet port 710 and a gas outlet port 712. In the cellar phone of the embodiment, the fuel cell unit 700 is detachably mounted on the cellar phone main body 500, and the fuel tank 400 is detachably mounted on the fuel cell unit 700.

The fuel remaining amount detection unit 702 detects a fuel remaining amount in the fuel tank 400 connected to the fuel cell unit 700 via the connectors 706 and 412, i.e., detects a hydrogen remaining amount in the hydrogen absorbing alloys 410.

A fuel tank attach and detach detection unit 704 detects whether the fuel tank 400 is mounted on the connector 708.

The connector 7046 interconnects the cellar phone main body 500 and fuel cell unit 700, and the connector 708 interconnects the fuel cell unit 700 and fuel tank 400. The gas inlet port 710 is used for supplying air to an oxygen electrode (not shown) of the fuel cell 80. The gas outlet port 712 is used for exhausting hydrogen, impurities and air used by the fuel cell 80 during purge of the fuel cell 80 to an external of the cellar phone main body 500.

Next, description will be made on a purge control operation of the cellar phone shown in FIGS. 13A and 13B.

Figure 14:
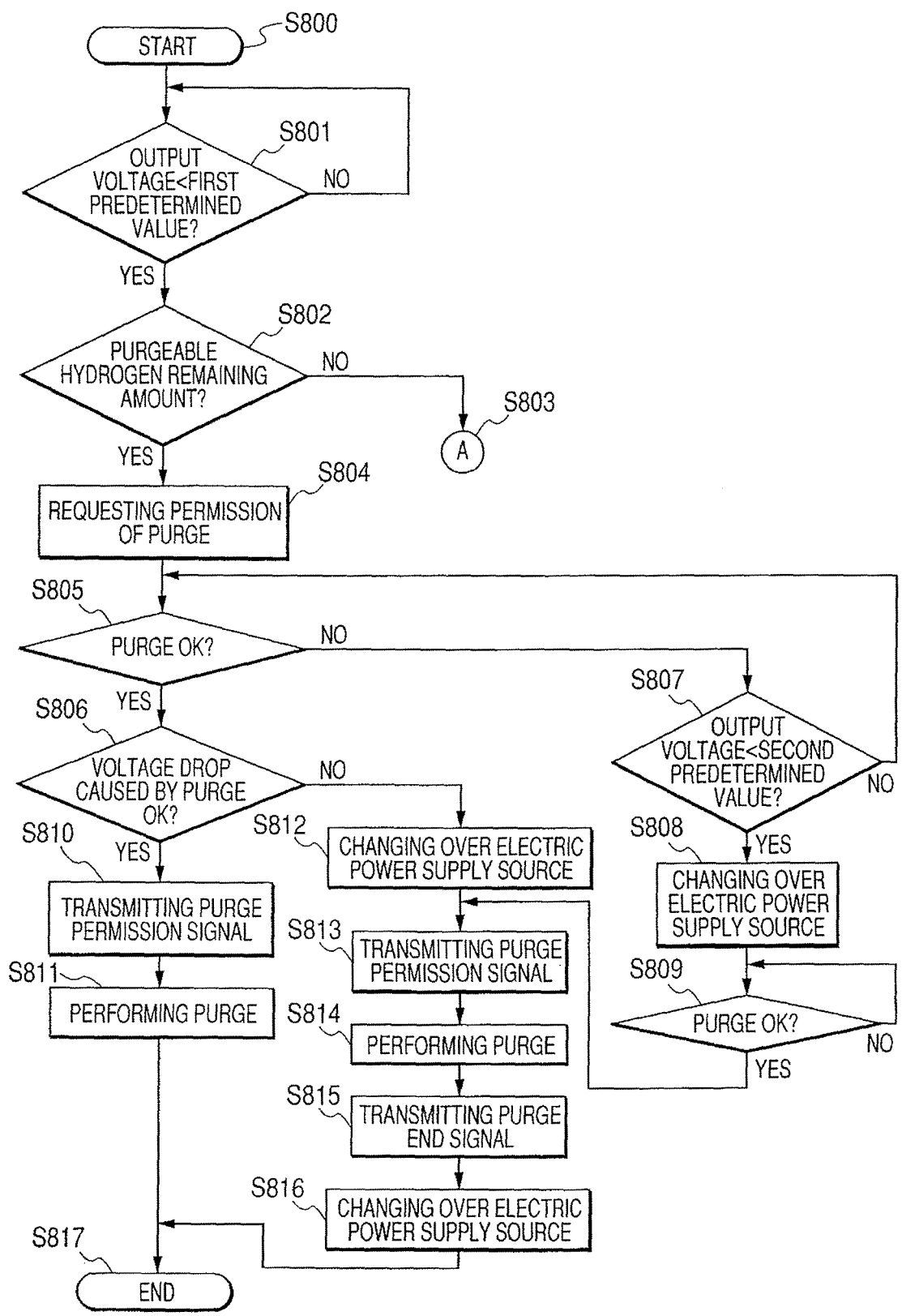
FIG. 14 is a flow chart illustrating the control operation of a fuel cell unit of the cellar phone shown in FIGS. 13A and 13B.

FIG. 14 is a flow chart illustrating a purge control operation of the cellar phone shown in FIGS. 13A and 13B. First, while the cellar phone main body 500 is driven by using the fuel cell 80 as an electric power source unit, the fuel cell system control circuit 90 makes the cell voltage detection circuit 89 measure a cell voltages of a fuel cell stack 81, and judges whether the cell voltage is lower than a first predetermined value at which purge is required (Step S801).

If it is judged that the cell voltage is higher than the first predetermined value (No at Step S801), the fuel cell system control circuit 90 returns to Step S801 to make the cell voltage detection circuit 89 measure a cell voltage of the fuel cell stack 81 and repeat Step S801 until the cell voltage becomes lower than the first predetermined value.

If it is judged that the cell voltage is lower than the first predetermined value (YES at Step S801), the fuel cell system control circuit 90 controls the fuel remaining amount detection unit 702 to detect a hydrogen remaining amount in the hydrogen absorbing alloys 410 and judge whether a sufficient amount of hydrogen for abrupt hydrogen emission by purge remains in the hydrogen absorbing alloys 410 (Step S802).

If the hydrogen remaining amount in the hydrogen absorbing alloys 410 is insufficient for purge (NO at Step S802), the flow advances to Step S804. The operation at Step S804 and following Steps will be described later with reference to FIG. 15.

If a hydrogen remaining amount in the hydrogen absorbing alloys 410 is insufficient for purge (YES at Step S802), the fuel cell system control circuit 90 transmits a purge permission signal to the cellar phone system control circuit 510 via the connectors 548 and 704 (Step S803).

Next, the cellar phone system control circuit 510 judges whether impurity exhaust by purge of the fuel cell unit 700 does not influence use of the cellar phone main body 500 (Step S805). For example, if the cellar phone main body 500 is photographing with the image pickup element 552 and purge is performed, there arises a possibility of hand shaking to be caused by vibrations during impurity exhaust. If the cellar phone main body 500 is picking up external sounds and voices from the microphone 534, there is a possibility that sounds during impurity exhaust by purge are picked up by to the microphone.

If it is judged at Step S805 that the operation state of the cellar phone main body 500 is not influenced by purge of the fuel cell unit 700 (YES at Step S805), the cellar phone system control circuit 510 controls the drive electric power detection unit 530 to judge whether a drive electric power of the cellar phone main body 500 has a level not influenced by a temporary voltage drop by purge (Step S806).

If it is judged at Step S805 that the operation state of the cellar phone main body 500 is influenced by purge of the fuel cell unit 700 (NO at Step S805), the fuel cell system control circuit 90 makes the cell voltage detection circuit 89 measure a cell voltage of the fuel cell stack 81, and judges whether a cell voltage is lower than a second predetermined value necessary for driving the cellar phone main body 500 (Step S807). If the cell voltage of the fuel cell stack 81 is higher than the second predetermined value (NO at Step S807), the flow returns to Step S805.

If the cell voltage of the fuel cell stack 81 is lower than the second predetermined value capable of driving the cellar phone main body 500 (YES at Step S807), the cellar phone system control circuit 510 controls the electric power change-over unit 542 to change the electric power source of the cellar phone main body 500 from the fuel cell unit 700 to the electric power source unit 600, to thereby supply an electric power to each component of the cellar phone main body 500 from the electric power source 602 via the connectors 546 and 604 (Step S808).

Next, the cellar phone system control circuit 510 judges whether impurity exhaust by purge of the fuel cell unit 700 does not influence use of the cellar phone main body 500 (Step S809).

If it is judged at Step S809 that impurity exhaust by purge of the fuel cell unit 700 does not influence use of the cellar phone main body 500 (YES at Step S809), the flow advances to Step S813.

If it is judged at Step S809 that impurity exhaust by purge of the fuel cell unit 700 influences use of the cellar phone main body 500 (NO at Step S809), judgment is repeated until the operation state of the cellar phone main body 500 enters the state wherein purge can be performed.

If it is judged at Step S806 that a drive electric power of the cellar phone main body 500 has a level not influenced by a temporary voltage drop by purge (YES at Step S806), the cellar phone system control circuit 510 transmits a purge permission signal to the fuel cell system control circuit 90 via the connectors 548 and 704 (Step S810).

Upon reception of the purge permission signal from the cellar phone system control circuit 510, the fuel cell system control circuit 90 controls a purge valve 83 to exhaust excessive water and impurities in the fuel cell stack to the external of the fuel cell unit 700 via the gas outlet port 710 (Step S811).

If it is judged at Step S806 that a drive electric power of the cellar phone main body 500 has a level influenced by a voltage drop by purge (NO at Step S806), the cellar phone system control circuit 510 controls the electric power change-over unit 542 to change over the electric power source of the cellar phone main body 500 from the fuel cell unit 700 to the electric power source unit 600 to supply an electric power to each component of the cellar phone main body 500 from the electric power source 602 via the connectors 546 and 604 (Step S812).

Next, the cellar phone system control circuit 510 transmits a purge permission signal to the fuel cell system control circuit 90 via the connectors 548 and 706 (Step S813). The fuel cell system control circuit 90 received the purge permission signal drives the purge valve 80 to effect purge and exhaust excessive water and impurities in the fuel cell stack to the external of the fuel cell unit 700 via the gas outlet port 710 (Step S814).

After the purge is completed, the fuel cell system control circuit 90 transmits a purge completion notice signal to the cellar phone system control circuit 510 via the connectors 548 and 706 (Step S815).

Upon reception of the purge completion notice signal from the fuel cell system control circuit 90, the cellar phone system control circuit 510 controls the electric power change-over unit 542 to change over the electric power source of the cellar phone main body 500 from the electric power source unit 600 to the fuel cell unit 700 (Step S816).

Figure 15:
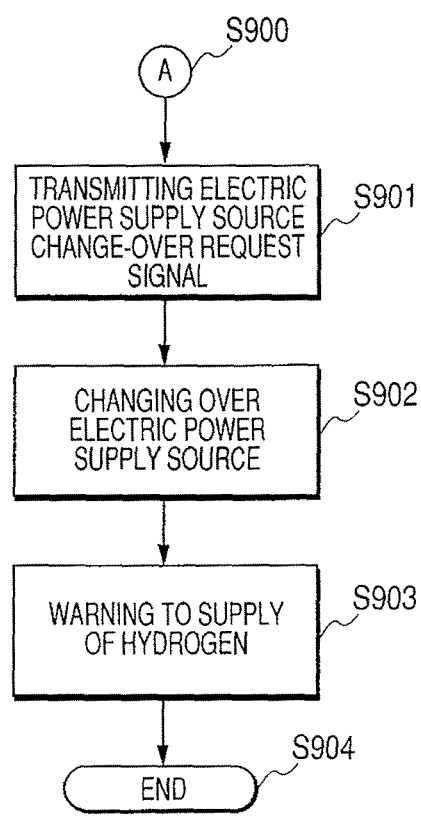
FIG. 15 is a flow chart illustrating the operation to be executed if it is judged at Step S802 shown in FIG. 14 that a sufficient amount of hydrogen for abrupt hydrogen emission by purge does not exist in the hydrogen absorbing alloys 410 in the fuel tank 400.

FIG. 15 is a flow chart illustrating the operation to be executed if it is judged at Step S802 shown in FIG. 14 that a sufficient amount of hydrogen for abrupt hydrogen emission by purge does not exist in the hydrogen absorbing alloys 410 in the fuel tank 400.

At Step S802 shown in FIG. 14, the fuel cell system control circuit 90 controls the fuel remaining amount detection unit 702 to detect a hydrogen remaining amount in the hydrogen absorbing alloys 410 and judge whether a sufficient amount of hydrogen for abrupt hydrogen emission by purge exists in the hydrogen absorbing alloys 410 in the fuel tank 400. If the hydrogen remaining amount in the hydrogen absorbing alloys 410 is insufficient for hydrogen emission by purge (NO at Step S802), the fuel cell system control circuit 90 transmits an electric power change-over request signal to the cellar phone system control circuit 510 via the connectors 548 and 706 to change over the electric power source of the cellar phone main body 500 from the fuel cell unit 700 to the electric power source unit 600 (Step S901).

Upon reception of the electric power change-over signal from the fuel cell system control circuit 90, the cellar phone system control circuit 510 controls the electric power source change-over unit 542 to change over the electric power source of the cellar phone main body 500 from the fuel cell unit 700 to the electric power source unit 600 and supply an electric power to each component of the cellar phone main body 500 from the electric power source 602 via the connectors 546 and 604 (Step S902).

Next, the cellar phone system control circuit 510, controls the fuel run-out warning unit 540 to warn the cellar phone user about the fact that hydrogen sufficient for driving the cellar phone does not exist in the hydrogen absorbing alloys 410 of the fuel tank 400 (Step S903).

As described above, according to the cellar phone of the embodiment, when an output voltage of the fuel cell unit 700 lowers and it becomes necessary to perform purge, a purge permission signal is transmitted to the cellar phone system control circuit 510. When purge is completed, a purge completion notice signal is transmitted. If the hydrogen remaining amount in the hydrogen absorbing alloys 410 is smaller than an amount necessary for purge, an electric power source change-over request signal is transmitted. In this manner, the cellar phone system control circuit 510 can grasp the operation state of the fuel cell unit 700.

Upon reception of the purge permission signal request signal from the fuel cell unit 700, the cellar phone system control circuit 510 transmits the purge permission signal to the fuel cell system control circuit 90 in accordance with the drive state of the cellar phone main body 500. Accordingly, the cellar phone can be used continuously, without being bothered about purge impacts (there is a possibility that a user receives impacts such as gas exhaust from the gas outlet port 710 by purge).

Further, if the cellar phone main body 500 cannot bear a temporary voltage drop by purge, a supply electric power source of the cellar phone main body 500 is changed over from the fuel cell unit 700 to the electric power source unit 600. It is therefore possible to prevent a battery run-out of the cellar phone main body 500 to be caused by a voltage drop during purge, and to continue driving by the fuel cell unit 700 without influencing the operation of the cellar phone.

Each means shown in FIGS. 1A, 1B and 2 constituting the single-lens reflex digital camera of the above-described embodiments and each step shown in FIG. 3 and FIGS. 5, 6, 7, 8, 9 and 10 illustrating a control method for the single-lens reflex digital camera, can be realized by running a program stored in a RAM or ROM of a computer. The present invention includes this program and a computer readable recording medium storing this program.

More specifically, the program is supplied to a computer in the form of a recording medium such as a CD-ROM or via various transmission media. The recording medium for recording the program includes in addition to CD-ROM, a flexible disc, a hard disc, a magnetic tape, a magneto optical disc, a non-volatile memory card and the like. The transmission media for the program may be communication media (wired lines such as optical fibers, wireless lines and the like) in a computer network (LAN, WAN such as the Internet, wireless communication networks and the like) for supplying program information by using carriers.

The present invention also includes other program types. Namely, the functions of the single-lens reflex digital camera of the embodiments are realized by running a program supplied to the computer, the functions of the single-lens reflex digital camera of the embodiments are realized by running the program in corporation with an operating system (OS) running in the computer or other application software, or the functions of the single-lens reflex digital camera of the embodiments are realized by making a function expansion board or a function expansion unit of a computer execute all or part of the processes of the supplied program.

This application claims priority from Japanese Patent Application No. 2005-140840 filed on May 13, 2005, which is hereby incorporated by reference herein.

The invention claimed is:

1. A control method for an electronic apparatus that is supplied with electric power from a fuel cell device, the fuel cell having an electric power output unit for outputting an electric power through a chemical reaction between fuel gas and oxidant gas and a purge unit for purging the electric power output unit, the control method comprising steps of:
   detecting a consumption power of the electronic apparatus; and
   permitting the purge unit to purge the electric power output unit of the fuel cell device if the consumption power of the electronic apparatus is smaller than a predetermined value.

2. A computer-readable program recorded on a non-transitory computer-readable recording medium and for making a computer execute the control method according to claim 1.

3. An electronic apparatus that is supplied with electric power from a fuel cell device, the fuel cell device having an electric power output unit for outputting an electric power through a chemical reaction between fuel gas and oxidant gas and a purge unit for purging the electric power output unit, the electronic apparatus comprising:
   a detection unit for detecting a consumption power of the electronic apparatus; and
   a purge permission unit for permitting the purge unit to purge the electric power output unit of the fuel cell device if the consumption power of the electronic apparatus is smaller than a predetermined value.

4. An electronic apparatus that is supplied with electric power from a fuel cell device, the fuel cell device having an electric power output unit for outputting an electric power through a chemical reaction between fuel gas and oxidant gas, a purge unit for purging the electric power output unit, and a fuel storing unit for storing at least the fuel gas and arranged to be detachably mounted on the electronic apparatus, the electronic apparatus comprising:
   a detection unit for detecting whether the fuel storing unit is mounted on the electronic apparatus or not; and
   a purge permission unit for permitting the purge unit to purge the electric power output unit of the fuel cell device if the detection unit detects that the fuel storing unit is mounted on the electronic apparatus.

5. An electronic apparatus that is supplied with electric power from a fuel cell device, the fuel cell device having an electric power output unit for outputting an electric power through a chemical reaction between fuel gas and oxidant gas and a purge unit for purging the electric power output unit, the electronic apparatus comprising:
   a time measurement unit for measuring time from when an operation member of the electronic apparatus is lastly operated by a user; and
   a purge permission unit for permitting the purge unit to purge the electric power output unit of the fuel cell device if the time reaches the predetermined time.

6. An electronic apparatus that is supplied with electric power from a fuel cell device or an electric power source device other than the fuel cell device, the fuel cell device having an electric power output unit for outputting an electric power through a chemical reaction between fuel gas and oxidant gas and a purge unit for purging the electric power output unit, the electronic apparatus comprising:
   an operation member which is operated by a user;
   an electric power source change-over unit for changing over an electric power source of the electronic apparatus from the fuel cell device to the electric power source device; and
   a purge permission unit for permitting the purge unit to purge the electric power output unit of the fuel cell device,
   wherein in a case where the operation member is operated by the user, the electric power source change-over unit changes over the electric power source of the electronic apparatus from the fuel cell device to the electric power source device, and
   wherein in a case where the electronic apparatus is supplied with electric power from the electric power source device, the purge permission unit permits the purge unit to purge the electric power output unit.

* * * * *